(12) United States Patent
Lee et al.

(10) Patent No.: US 12,556,068 B2
(45) Date of Patent: Feb. 17, 2026

(54) ROBOT WHEEL DRIVING APPARATUS

(71) Applicant: LG ELECTRONICS INC., Seoul (KR)

(72) Inventors: Jangwon Lee, Seoul (KR); Young Il Park, Seoul (KR); Young Chul Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 18/242,303

(22) Filed: Sep. 5, 2023

(65) Prior Publication Data

US 2024/0178728 A1 May 30, 2024

(30) Foreign Application Priority Data

Nov. 29, 2022 (KR) .................. 10-2022-0162276

(51) Int. Cl.
| | | |
|---|---|---|
| *H02K 11/21* | (2016.01) | |
| *B60K 7/00* | (2006.01) | |
| *B62D 25/16* | (2006.01) | |
| *H02K 7/08* | (2006.01) | |
| *H02K 11/215* | (2016.01) | |
| *H02K 11/33* | (2016.01) | |
| *H02K 21/22* | (2006.01) | |
| *H02K 29/03* | (2006.01) | |

(52) U.S. Cl.
CPC .......... *H02K 11/215* (2016.01); *B60K 7/0007* (2013.01); *B62D 25/16* (2013.01); *H02K 7/085* (2013.01); *H02K 11/33* (2016.01); *H02K 21/22* (2013.01); *H02K 29/03* (2013.01); *H02K 2211/03* (2013.01)

(58) Field of Classification Search
CPC .... B60K 2007/0038; B60K 2007/0092; B60K 7/0007; B62D 25/16; H02K 11/215; H02K 11/33; H02K 21/22; H02K 2211/03; H02K 29/03; H02K 7/085
See application file for complete search history.

(56) References Cited

U.S. PATENT DOCUMENTS

| | | |
|---|---|---|
| 2008/0211357 A1 | 9/2008 | Kataoka et al. |
| 2012/0181099 A1 | 7/2012 | Moon et al. |
| 2020/0391719 A1 | 12/2020 | Oh et al. |

FOREIGN PATENT DOCUMENTS

| | | | | |
|---|---|---|---|---|
| EP | 2381566 A2 | * | 10/2011 | .............. B60L 50/20 |
| JP | 4499320 B2 | * | 7/2010 | .............. B60T 1/067 |
| JP | 5093748 B2 | | 12/2012 | |

(Continued)

OTHER PUBLICATIONS

JP-4499320-B2, all pages (Year: 2010).*

(Continued)

*Primary Examiner* — Naishadh N Desai
(74) *Attorney, Agent, or Firm* — Fish & Richardson P.C.

(57) ABSTRACT

A robot wheel driving apparatus includes a wheel configured to rotate to drive a robot, a motor housing positioned inside the wheel, a motor including a stator and a rotor configured to rotate about the stator to transmit a rotating force to the wheel, a sensor magnet connected to the rotor, and an encoder sensor configured to receive a change in a magnetic field caused by rotation of the sensor magnet to detect a rotation angle of the rotor. A first set distance is maintained between the sensor magnet and the encoder sensor.

17 Claims, 16 Drawing Sheets

(56) References Cited

FOREIGN PATENT DOCUMENTS

| | | | | |
|---|---|---|---|---|
| JP | 6842838 B2 * | 3/2021 | ............... | B60K 7/00 |
| KR | 10-1523980 B1 | 6/2015 | | |
| KR | 10-1960633 B1 | 3/2019 | | |
| KR | 102020126414 | 11/2020 | | |
| KR | 10-2022-0108559 A | 8/2022 | | |

OTHER PUBLICATIONS

JP-6842838-B2, all pages (Year: 2021).*
EP-2381566-A2, all pages (Year: 2011).*
Office Action in Korean Appln. No. 10-2022-0162276, mailed on Nov. 23, 2024, 16 pages (with English translation).

* cited by examiner

ROBOT WHEEL DRIVING APPARATUS

CROSS-REFERENCE TO RELATED APPLICATION

This application claims priority to and the benefit of Korean Patent Application No. 10-2022-0162276, filed on Nov. 29, 2022, the disclosure of which is incorporated herein by reference in its entirety.

BACKGROUND

1. Field

Embodiments of the present disclosure relate to a robot wheel driving apparatus, and more specifically, to a robot wheel driving apparatus, in which control precision of a motor is improved, a torque of the motor is increased, and a torque ripple is decreased by optimally designing relative positions and distances of an encoder sensor, a sensor magnet, and a magnetic part (e.g., a bearing or a washer) when a magnetic encoder is applied to an inverter motor.

2. Description of the Related Art

Contents to be described below are only described for the purpose of providing background information related to embodiments of the present disclosure, and it goes without saying that the described contents do not constitute the related art.

Robots are mechanical devices capable of recognizing an external environment by itself and autonomously operating by determining situations. Depending on the purpose, robots may be classified into industrial robots and service robots.

Until now, the focus has been on the purpose of mechanical utilization rather than a direction of approaching human intelligence, and the robot has been mainly used for factory automation such as doing simple repetitive tasks that are difficult for people to do.

In recent years, with the rapid development of an artificial intelligence technology and increases in levels of Internet of Things (IOT), sensors, and cloud technologies, robots with intelligence different from before are appearing.

Home robots may not only help with daily activities at home while interacting with people and provide entertainment, but also perform various roles such as improving fire, noise, and risk factors.

Meanwhile, various types of devices required for these robots to move are being developed, and representatively, the technology development for a driving apparatus such as a robot wheel motor is being conducted.

For example, robot wheel driving apparatuses may be connected to a leg of a robot and may each use a motor to rotate a wheel equipped with a tire at a set speed. In addition, an inverter motor may be used as the motor used in the robot wheel driving apparatuses.

The inverter motor has an advantage in that a rotating speed of the motor may be freely adjusted through a power supplied to the motor, unnecessary energy consumption and noise can be significantly reduced, and delicate operations can be implemented.

The inverter motor mainly used in the robot wheel driving apparatus includes an inverter and an encoder.

The encoder detects a rotation angle of the motor to enable precise position control and speed control of the motor.

The encoder is a very sensitive measuring device. When a magnetic encoder is applied to the inverter motor, several factors that affect the detection of the magnetic encoder need to be considered. Therefore, the magnetic encoder requires a lot of attention upon designing a position and distance from nearby components.

As an example, an assembling method of the magnetic encoder and a motor component affecting a magnetic field of a sensor magnet requires technical know-how.

The magnetic encoder includes the sensor magnet and an encoder sensor. The sensor magnet is connected to a rotor of the motor and rotates with the rotor. The encoder sensor receives a change in the magnetic field (or a magnetic flux density) at each angle generated while the sensor magnet rotates to determine a rotation angle of the rotor.

However, although encoders by manufacturer are different, the clearest range (e.g., 30 to 60 mT) for a received signal among the magnetic flux densities of the sensor magnet received from the encoder sensor is present. Therefore, it is important to appropriately maintain a distance between the sensor magnet and the encoder sensor in order not to be out of the magnetic flux density range.

However, when a magnetic part is positioned around the encoder sensor and the sensor magnet, the magnet part affects the magnetic field of the sensor magnet, thereby affecting changes in strengths of the magnetic field and the magnetic flux density when the sensor magnet rotates.

Therefore, in the case in which the magnetic part is assembled or disposed around the encoder sensor and the sensor magnet, leakage and imbalance of the magnetic field of the sensor magnet may be caused, and thus it is necessary to solve this.

In particular, when the imbalance of the magnetic field increases according to the rotation angle of the sensor magnet, an error of the rotation angle determined by the magnetic encoder becomes large. This adversely affects the position precision of the motor control, causes an increase in a torque ripple of the motor, and causes an increase in vibration.

Therefore, when the magnetic encoder is applied to the inverter motor applied to the robot wheel driving apparatus, a technical solution capable of increasing the accuracy of the magnetic encoder by accurately designing a position and distance relationship with a component formed of a magnetic part is required.

As the related art related to the present disclosure, Korean Patent Application Laid-Open No. 10-2020-0126414 (published on Nov. 6, 2020) discloses an encoder and a motor. According to the related art disclosed herein, the encoder includes a magnet rotatably supported, and a magnetic field detection unit for detecting a magnetic field generated by the magnet and outputting a signal. In addition, a protective cover for covering the magnet and a control board is disclosed. However, according to the related art, a bearing or the like is positioned around a shaft for supporting the magnet, and thus leakage and imbalance of the magnetic field of the magnet may be caused due to a component such as the bearing that is a magnetic part, but a method for solving this is not suggested.

RELATED ART DOCUMENT

Patent Document (Patent Document 1) Korean Patent Application Laid-Open No. 10-2020-0126414

SUMMARY

The present disclosure is directed to providing a robot wheel driving apparatus in which control precision of a motor is improved, a torque of the motor is increased, and a torque ripple is decreased.

The present disclosure is directed to providing a robot wheel driving apparatus capable of preventing leakage and imbalance of a magnetic field of a sensor magnet when a magnetic part (e.g., a bearing or a washer) is assembled around an encoder sensor and the sensor magnet in an inverter motor to which a magnetic encoder is applied.

The present disclosure is also directed to providing a robot wheel driving apparatus in which accuracy of a magnetic encoder is increased by accurately suggesting relative positions and distances of an encoder sensor, a sensor magnet, and a magnetic part (e.g., a bearing or a washer) when a magnetic encoder is applied to an inverter motor and reflecting this in a design.

Objects of the present disclosure are not limited to the above-described objects, and other objects and advantages of the present disclosure that are not mentioned can be understood by the following description and more clearly understood by embodiments of the present disclosure. In addition, it will be able to be easily seen that the objects and advantages of the present disclosure may be achieved by devices and combinations thereof that are described in the claims.

According to one aspect of the present disclosure, there may be provided a robot wheel driving apparatus in which control precision of a motor is improved, a torque of the motor is increased, and a torque ripple is decreased by improving an angle error of a magnetic encoder.

In addition, according to another aspect of the present disclosure, there may be provided a robot wheel driving apparatus in which accuracy of a magnetic encoder is increased by accurately reflecting a relative position and distance relationship with a magnetic part (e.g., a bearing or a washer) in a design when a magnetic encoder is applied to an inverter motor applied to the robot wheel driving apparatus.

The robot wheel driving apparatus according to one embodiment of the present disclosure includes a wheel, a motor housing, a motor, and a magnetic encoder.

The wheel may have a circular body configured to rotate to drive a robot.

The motor housing may be provided inside the wheel and may have a cylindrical shape with one open surface. The motor housing includes a disk-shaped first motor housing portion that may be seated inside the wheel, and a circular tube-shaped second motor housing portion that may be in close contact with an inner circumferential surface of the wheel.

A through hole having a predetermined diameter and formed to pass therethrough in a thickness direction may be provided at a center of the first motor housing portion. The through hole may be used as a portion into which a rear end of a rotational shaft (specifically, a second rotational shaft portion) of a rotor frame is inserted.

The rotational shaft of the rotor frame may be inserted through the through hole and then connected to a fastening hole of the wheel, and as a bolt sequentially fastens the fastening hole of the wheel and a fastening groove of the rotational shaft, the rotational shaft of the rotor frame and the center of the wheel may be firmly connected.

The motor may be inserted into the motor housing and provide a rotating force to the wheel. Here, the motor may be an inverter-integrated motor.

The motor may include a stator fixed inside the motor housing and a rotor disposed outside the stator with an air gap interposed therebetween and configured to rotate about the stator and transmit a rotating force to the wheel.

The magnetic encoder may detect a rotation angle of the rotor. The magnetic encoder may include a sensor magnet connected to the rotor to rotate with the rotor, and an encoder sensor positioned to face the sensor magnet and configured to receive a change in a magnetic field caused by rotation of the sensor magnet to detect a rotation angle of the rotor.

In the robot wheel driving apparatus according to one embodiment of the present disclosure, a first set distance may be maintained between the sensor magnet and the encoder sensor.

The stator may include a plurality of coils disposed in a circumferential direction, and a stator core in which the plurality of coils are wound and mounted.

The rotor may include a plurality of magnets disposed to face the plurality of coils in a circumferential direction, and a rotor frame configured to fix the plurality of magnets, concentrically connected to the wheel, and configured to rotate inside the motor housing.

The rotor frame may include a rotational shaft formed in a center direction of the motor, and the sensor magnet may be positioned at a front end of the rotational shaft.

The rotor frame may include the rotational shaft formed from the center of the rotor frame in a central direction of the motor, and the rotational shaft may include a first rotational shaft portion supported by a first bearing, and a second rotational shaft portion having a greater diameter than the first rotational shaft portion, integrally connected to a rear end of the first rotational shaft portion, and supported by a second bearing. In this case, the sensor magnet may be coupled to a front end of the first rotational shaft portion.

The rotational shaft may further include a wave washer disposed in contact with a front end of the first bearing.

In the robot wheel driving apparatus according to one embodiment of the present disclosure, a second set distance may be maintained between the sensor magnet and the wave washer.

The rotor frame may include a disc-shaped rotor hub, and a rotor yoke connected in a cylindrical shape along an edge of the rotor hub and having a plurality of magnets each attached to an inner wall surface thereof. The rotor yoke may have a ring shape in which the plurality of magnets are attached.

The rotor hub may include a disk-shaped outer frame formed at a position far from the center of the motor in a radial direction, a disk-shaped inner frame formed at a position close to the center of the motor in the radial direction and connected (i.e., connected to have different heights) to the outer frame with a step therebetween, and an inclined frame connecting the outer frame to the inner frame.

In addition, the robot wheel driving apparatus according to one embodiment of the present disclosure may further include an inverter cover coupled to one side of the motor housing, and a PCB disposed inside the inverter cover to face the motor.

The encoder sensor may be coupled to the PCB and positioned to face the sensor magnet connected to the rotor while maintaining the first set distance.

An electrolytic capacitor usable for an inverter DC link may be disposed inside the inverter cover. The PCB may be provided inside the inverter cover and disposed to face the motor.

A fastening groove for bolt-fastening may be provided at a rear end of the rotational shaft, that is, a rear end of the second rotational shaft portion. The fastening groove may be positioned at the center of the motor and connected to a fastening hole formed to pass through the center of the wheel. Therefore, the bolt may be fastened to pass through the fastening hole of the wheel and then inserted into and fastened to the fastening groove positioned at the rear end of the rotational shaft. Therefore, the wheel and the rotor frame may be concentrically coupled. Therefore, when the rotor frame rotates within the motor housing, a rotating force may be transmitted to the wheel coupled concentrically with the rotor frame so that the rotation of the wheel required for the robot to travel may be possible.

The rotor hub may further include a plurality of holes formed to pass therethrough in a thickness direction.

The plurality of holes may be formed to have six holes. The six holes may be formed to be spaced a predetermined distance from each other radially with respect to the center of the motor.

The plurality of holes may be used as a space for flowing air. In addition, the plurality of holes can reduce a weight of the rotor hub, thereby reducing a weight of the entire motor.

The stator may further include a stator frame configured to support the stator. One surface of the stator frame may be coupled to the motor housing to cover an open portion of the motor housing, and the other surface of the stator frame may cover and be coupled to the inverter cover. The PCB may be fastened to the stator frame and fixedly positioned inside the inverter cover.

The stator frame may include a first stator frame portion, a second stator frame portion, and a third stator frame portion. The first stator frame portion may circularly protrude to face the center of the motor. The second stator frame portion may circularly protrude a predetermined distance from the first stator frame portion in the radial direction. The third stator frame portion may radially connect the first stator frame portion to the second stator frame portion. The PCB may be fastened to the second stator frame portion.

A cylindrical groove may be formed at the center of the first stator frame portion, and a front end of the first rotational shaft portion of the rotational shaft may be inserted into and supported by the cylindrical groove. A first bearing may be inserted between the cylindrical groove and the front end of the first rotational shaft portion. The first bearing may reduce rotation friction of the first rotational shaft portion and support the first rotational shaft portion. In addition, the second rotational shaft portion may be supported by a second bearing.

A through hole may be provided at the center of the first motor housing portion. The motor housing may have a cylindrical support groove around the through hole. The support groove may be used as a region into which the second bearing is inserted. The second bearing may be constrained to the support groove and disposed between the second rotational shaft portion passing through the through hole and the motor housing. The second bearing may reduce rotation friction of the second rotational shaft portion and support the second rotational shaft portion.

The second stator frame portion may include a circular protrusion protruding toward the motor. The circular protrusion may protrude to the inside of the motor and have a structure in which an outer circumferential surface of the protruding portion and an inner circumferential surface of the stator core are in close contact with each other. Therefore, the second stator frame portion may firmly support the stator, particularly, the stator core.

The second stator frame portion may include a plurality of PCB fastening portions. The plurality of PCB fastening portions may be portions to which a plurality of bolts passing through the PCB are screw-coupled and may firmly fix the PCB.

The robot wheel driving apparatus according to one embodiment of the present disclosure includes a wheel, a wheel cover, a lower cover, a motor housing, a motor, and a magnetic encoder. The wheel has a circular body configured to rotate by being coupled to a tire to drive a robot. The wheel cover is connected to the wheel to cover both sides of the wheel. The lower cover is coupled to a lower portion of the wheel cover. The lower cover is coupled to an open portion of the wheel cover to cover an open portion between the tire exposed to the lower portion of the wheel and the wheel cover when the wheel and the wheel cover are connected. Therefore, it is possible to prevent foreign substances outside the wheel from flowing into an inside of the wheel. The motor housing is provided inside the wheel and has a cylindrical shape with one open surface. The motor includes a stator fixed inside the motor housing, and a rotor disposed outside the stator and configured to rotate about the stator to transmit a rotating force to the wheel. The magnetic encoder detects a rotation angle of the rotor.

The magnetic encoder may include a sensor magnet connected to the rotor to rotate with the rotor, and an encoder sensor positioned to face the sensor magnet and configured to receive a change in a magnetic field caused by rotation of the sensor magnet to detect the rotation angle of the rotor. A first set distance may be maintained between the sensor magnet and the encoder sensor.

The rotor may include a plurality of magnets disposed in the circumferential direction to face the stator with an air gap interposed therebetween, and a rotor frame configured to fix the plurality of magnets and concentrically connected to the wheel to rotate inside the motor housing. The rotor frame may include a rotational shaft formed in a central direction of the motor. The sensor magnet may be positioned at a front end of the rotational shaft.

The rotor shaft may include a first rotational shaft portion supported by a first bearing, and a second rotational shaft portion having a greater diameter than the first rotational shaft portion, integrally connected to a rear end of the first rotational shaft portion, and supported by a second bearing. The sensor magnet may be positioned at a front end of the first rotational shaft portion.

The rotational shaft may further include a wave washer disposed in contact with a front end of the first bearing.

In the robot wheel driving apparatus according to one embodiment of the present disclosure, a second set distance may be maintained between the sensor magnet and the wave washer.

The wheel may include a disk-shaped first wheel body portion and a second wheel body portion protruding in a circular tube shape along an edge of the first wheel body portion and equipped with a tire.

The wheel cover may include a first wheel cover portion configured to cover one side of the wheel, a second wheel cover portion coupled to face the first wheel cover portion with the wheel interposed therebetween and configured to cover the other side of the wheel, and a leg connector connecting the first wheel cover portion and the second wheel cover portion to a robot body.

The first wheel cover portion may include a first cover body having a shape that convexly covers one side of the wheel in order to secure a first internal space having a predetermined size between the first wheel cover portion and the one side of the wheel, and a first connector extending from an upper end of the first cover body in a height direction and connecting the first cover body to the leg connector.

The second wheel cover portion may include a second cover body having a shape that convexly covers the other side of the wheel in order to secure a second internal space having a predetermined size between the second wheel cover portion and the other side of the wheel, and a second connector extending from an upper end of the second cover body in the height direction and connecting the second cover body to the leg connector.

The robot wheel driving apparatus according to one embodiment of the present disclosure may further include a link. The link may be embedded in the wheel cover and connect the motor to the wheel cover to constrain a position of the motor. One end of the link may be fixed to the wheel cover, and the other end of the link may be fixed to the motor. For example, the one end of the link may be a straight link portion, and the other end of the link may be a circular link portion. The straight link portion may be fixed to an inner side of at least one of the first and second connectors. The circular link portion may be connected to a lower end of the straight link portion and fixed to the motor. In addition, the circular link portion may be fixedly bolt-fastened to a stator frame, and the inverter cover protruding in a circular cap shape may be positioned in an internal hollow of the circular link portion.

A fastening groove may be provided in an inner circumferential surface of the tire. In addition, a fastening protrusion inserted into the fastening groove may be provided on an outer circumferential surface of the second wheel body portion. The fastening protrusion may include a band-shaped first fastening protrusion that surrounds the outer circumferential surface of the second wheel body portion in a circumferential direction, and a plurality of second fastening protrusions that protrude in a direction intersecting the first fastening protrusion and formed at a predetermined interval.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
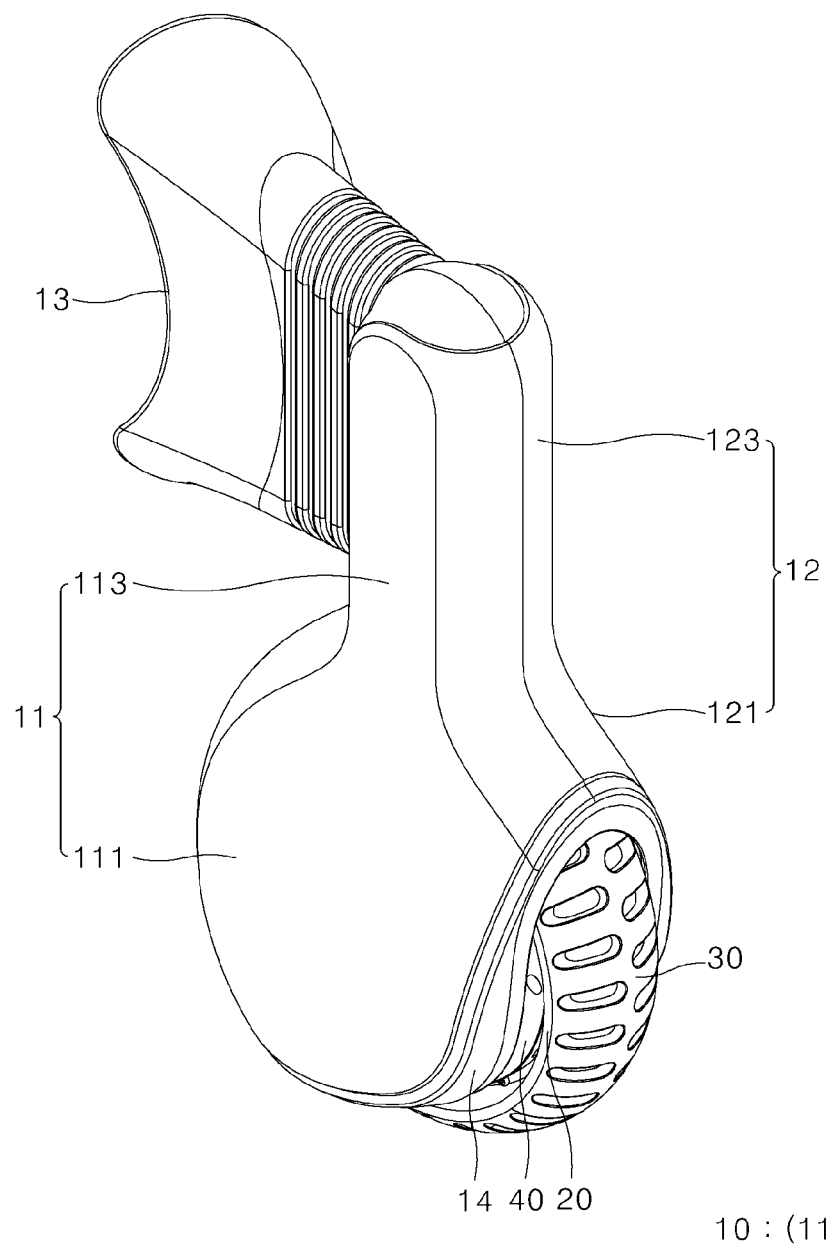
FIG. 1 is a front perspective view schematically illustrating a robot wheel driving apparatus according to one embodiment of the present disclosure.
Figure 2:
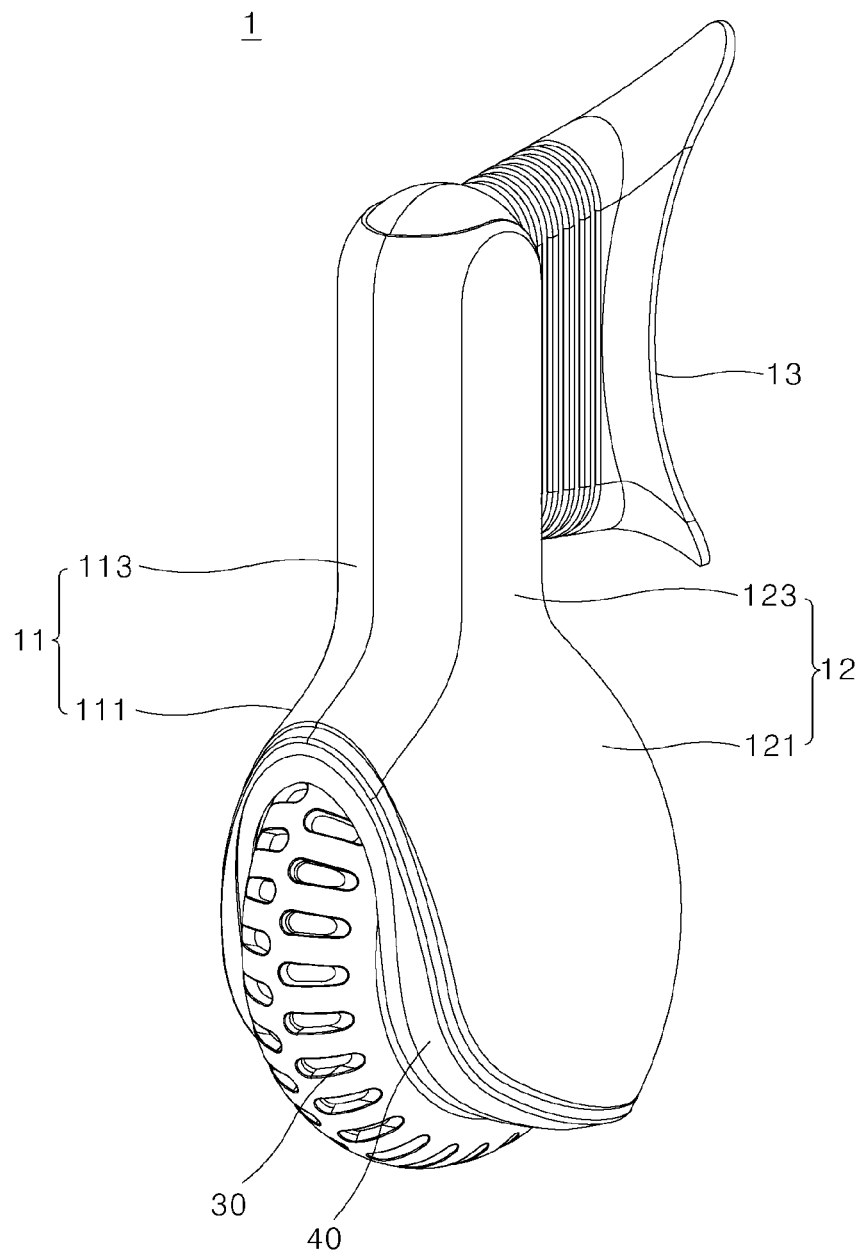
FIG. 2 is a rear perspective view schematically illustrating the robot wheel driving apparatus according to one embodiment of the present disclosure.
Figure 3:
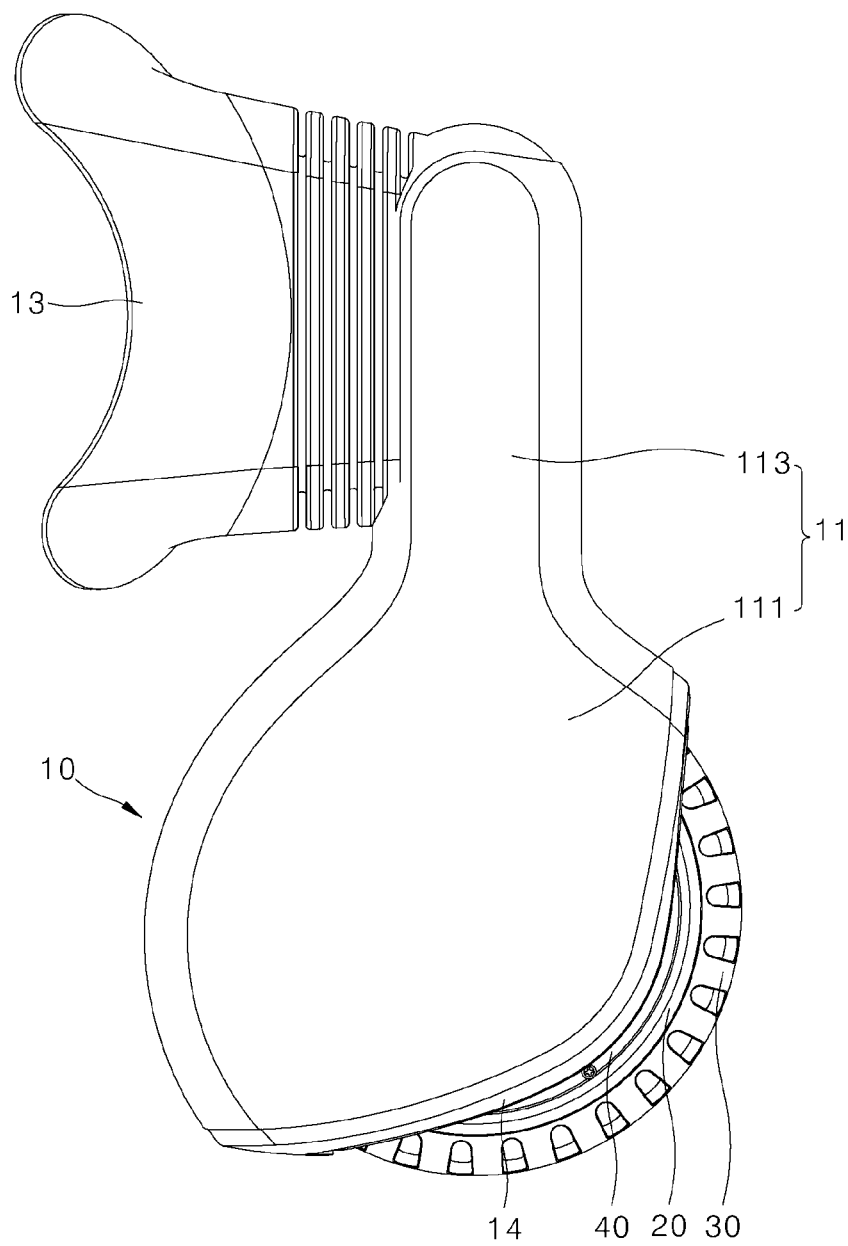
FIG. 3 is a left side view schematically illustrating the robot wheel driving apparatus according to one embodiment of the present disclosure.
Figure 4:
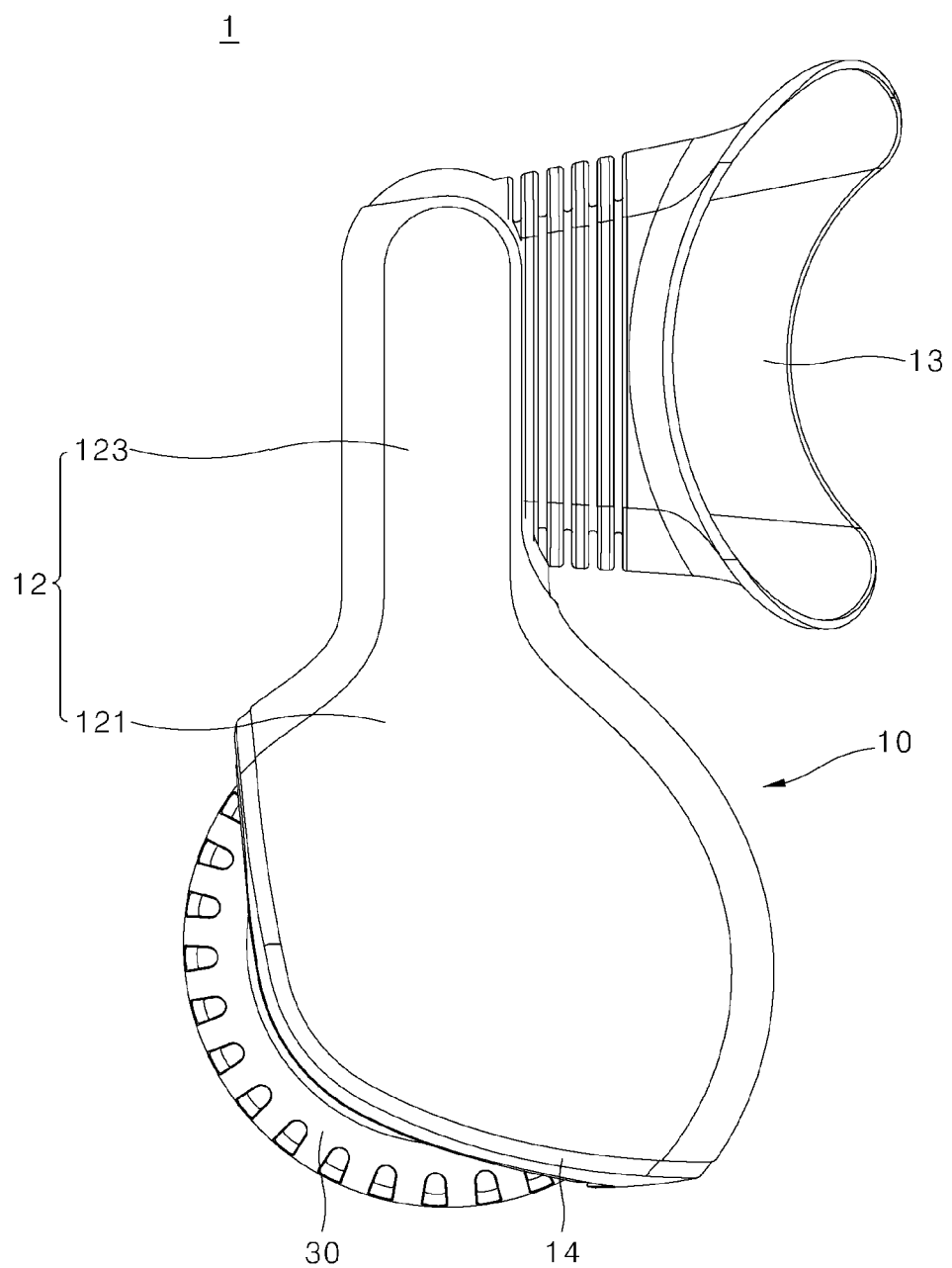
FIG. 4 is a right side view schematically illustrating the robot wheel driving apparatus according to one embodiment of the present disclosure.
Figure 5:
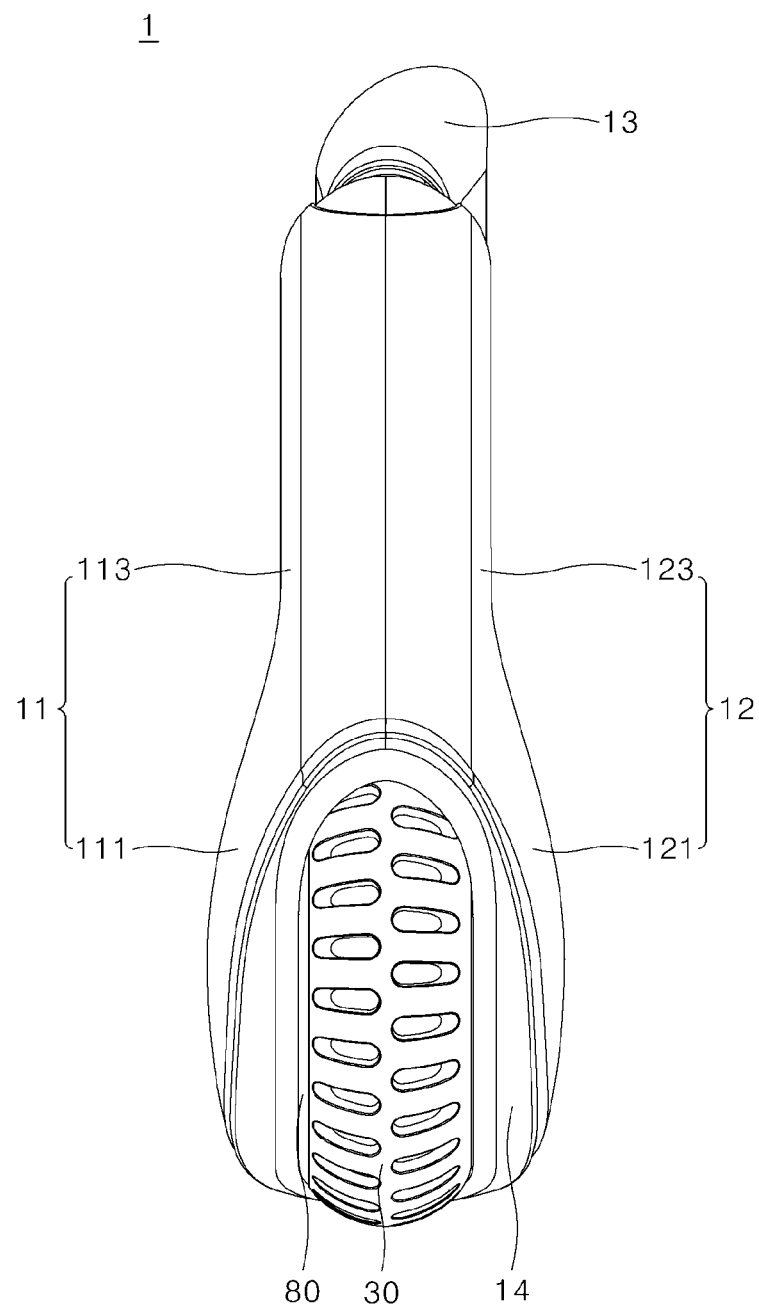
FIG. 5 is a front view schematically illustrating the robot wheel driving apparatus according to one embodiment of the present disclosure.

The above-described objects, features, and advantages will be described below in detail with reference to the accompanying drawings, and thus those skilled in the art to which the present disclosure pertains will be able to easily carry out the technical spirit of the present disclosure. In describing the present disclosure, when it is determined that a detailed description of the known technology related to the present disclosure may unnecessarily obscure the gist of the present disclosure, a detailed description thereof will be omitted. Hereinafter, preferred embodiments according to the present disclosure will be described in detail with reference to the accompanying drawings. In the drawings, the same reference numerals are used to indicate the same or similar components.

Although the terms first, second, and the like are used to describe various components, it goes without saying that these components are not limited by these terms. These terms are only used to distinguish one component from another component, and unless otherwise stated, it goes without saying that the first component may also be the second component.

Throughout the specification, unless otherwise stated, each component may be singular or plural.

Hereinafter, the arrangement of an arbitrary component on an "upper portion (or lower portion)" of a component or "above (or under)" the component may not only mean that the arbitrary component is disposed in contact with an upper surface (or a lower surface) of the component, but also mean that other components may be interposed between the component and the arbitrary component disposed above (or under) the component.

In addition, when a certain component is described as being "connected," "coupled," or "joined" to another component, the components may be directly connected or joined, but it should be understood that other components may be "interposed" between the components, or the components may be "connected," "coupled," or "joined" through another component.

The singular expression used herein includes the plural expression unless the context clearly dictates otherwise. In the application, terms such as "composed of" or "comprising" should not be construed as necessarily including all of the various components or operations described in the specification and should be construed as not including some of the components or some of the operations or further including additional components or operations.

Throughout the specification, when "A and/or B" is described, this means A, B, or A and B unless otherwise specified, and when "C to D" is described, this means C or more and D or less unless otherwise specified.

In the following description, a robot is a robot capable of moving in forward, backward, left, and right directions by driving a wheel.

In the following description, a robot wheel driving apparatus may be connected to a leg of a body of a robot and uses a motor to rotate a wheel equipped with a tire at a set speed.

In the following description, the motor used in the robot wheel driving apparatus may be an inverter-integrated motor. In the inverter-integrated motor, a rotating speed of the motor can be freely adjusted through a power supplied to the motor, unnecessary energy consumption and noise can be significantly reduced, and delicate operations can be implemented.

Hereinafter, the present disclosure will be described in detail with reference to the accompanying drawings illustrating a robot wheel driving apparatus according to embodiments of the present disclosure.

[Overall Structure of Robot Wheel Driving Apparatus]

Hereinafter, the overall structure of the robot wheel driving apparatus according to one embodiment of the present disclosure will be described in detail with reference to the accompanying drawings.

Figure 6:
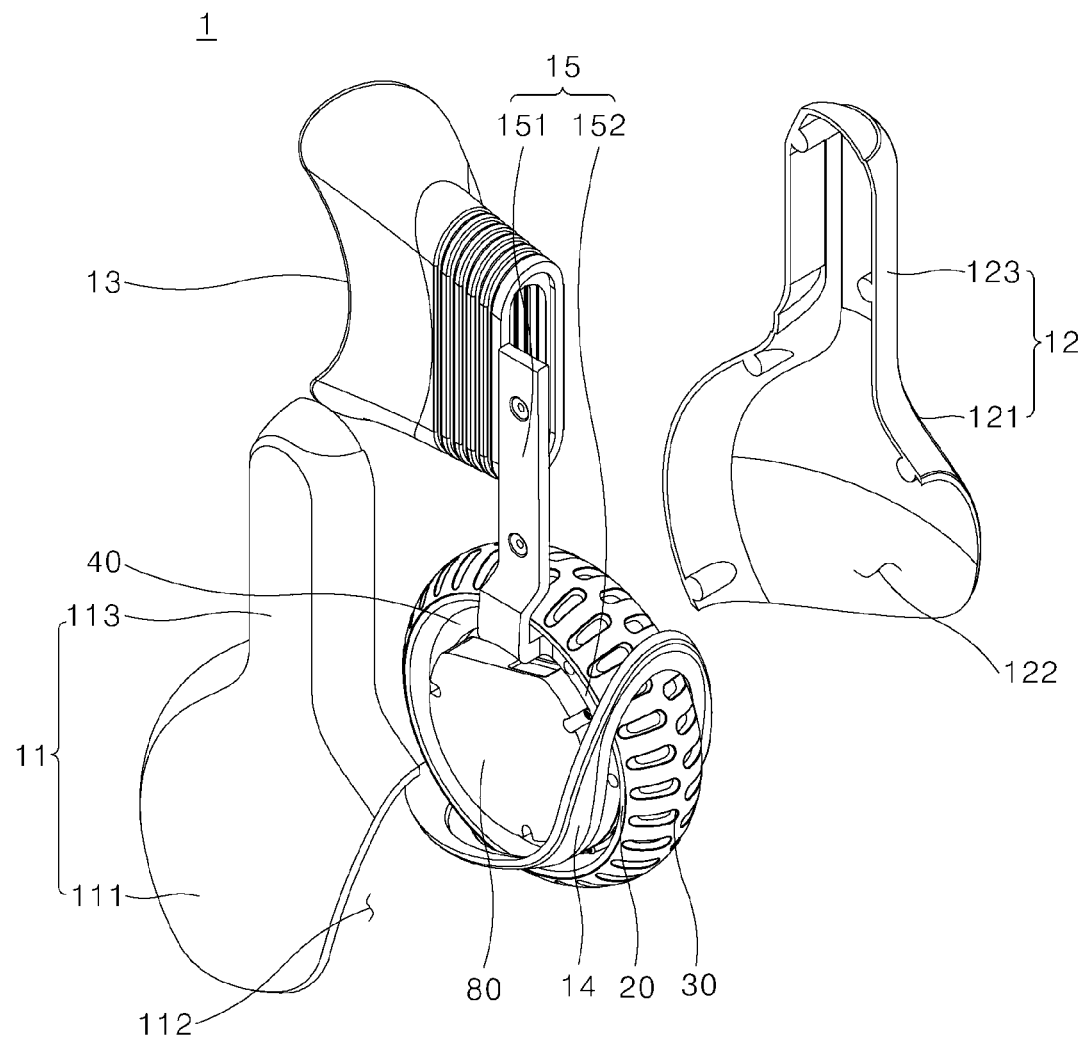
FIG. 6 is an exploded perspective view schematically illustrating the robot wheel driving apparatus according to one embodiment of the present disclosure.
Figure 7:
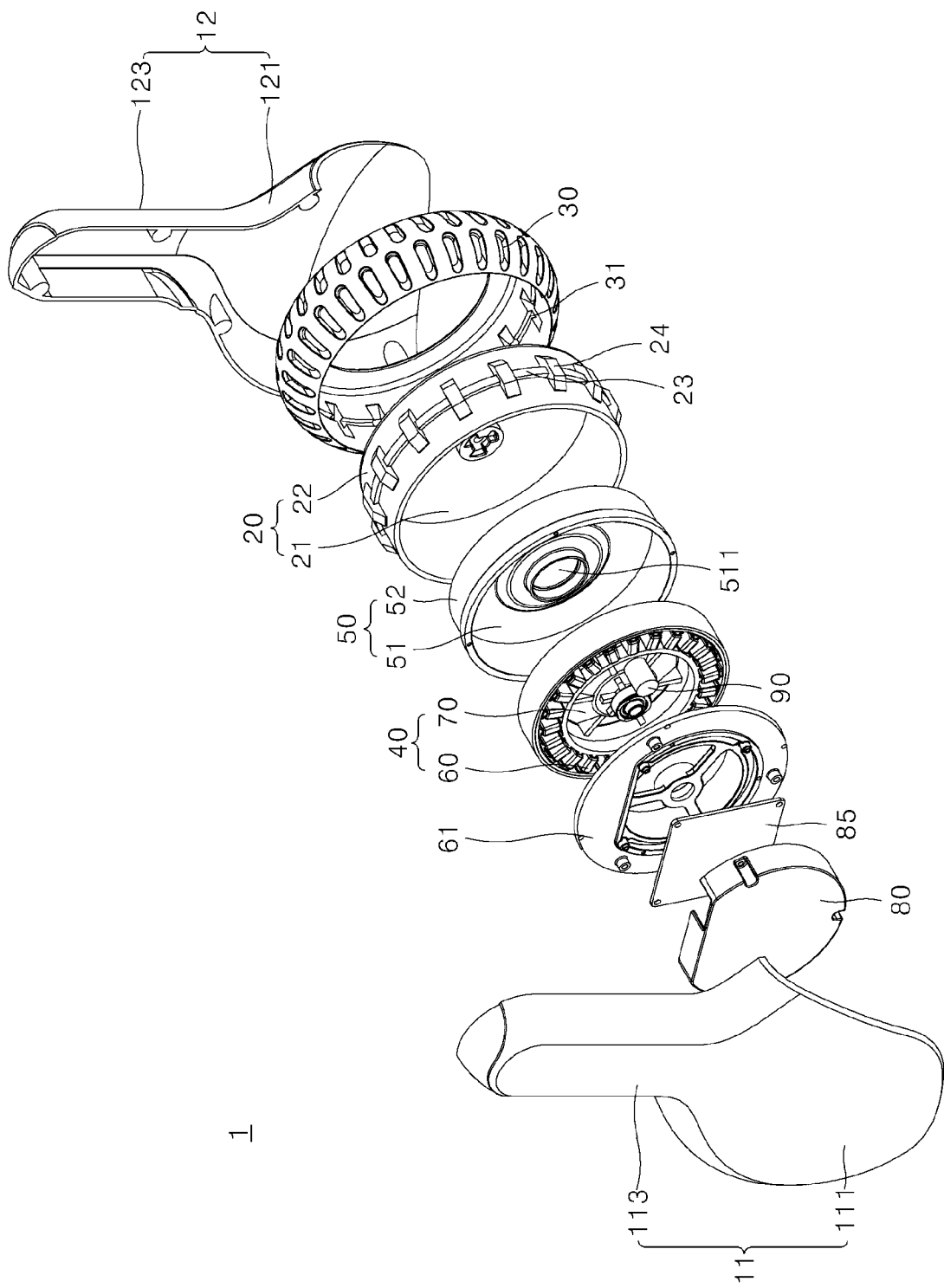
FIG. 7 is an exploded perspective view schematically illustrating a wheel cover, a wheel, a motor housing, a motor, an inverter cover, a printed circuit board (PCB) of the robot wheel driving apparatus according to one embodiment of the present disclosure.
Figure 8:
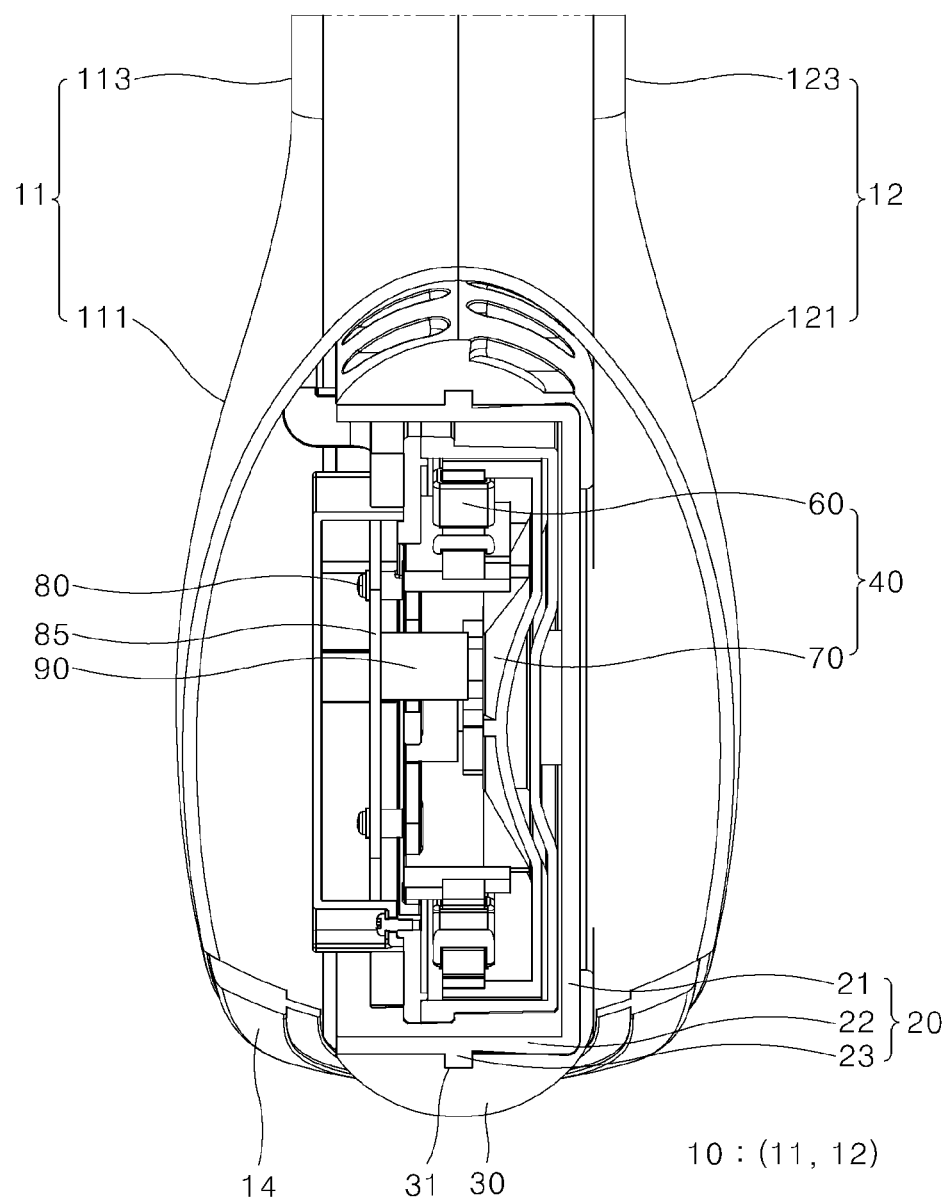
FIG. 8 is a cross-sectional view schematically illustrating the entire structure of the robot wheel driving apparatus according to one embodiment of the present disclosure.

FIGS. 1 to 5 are a front perspective view, a rear perspective view, a left side view, a right side view, and a front view schematically illustrating the entire structure of the robot wheel driving apparatus. In addition, FIGS. 6 and 7 are exploded views illustrating the entire structure of the robot wheel driving apparatus. FIG. 8 is a cross-sectional view of the robot wheel driving apparatus.

As illustrated, a robot wheel driving apparatus 1 according to an embodiment of the present disclosure includes a wheel cover 10, a wheel 20, a tire 30, a motor 40, a motor housing 50, an inverter cover 80, a printed circuit board (PCB) 85, and an electrolytic capacitor 90.

The wheel cover 10 has a shape that covers both sides of the wheel 20 and is connected to the wheel 20.

As a specific example, the wheel cover 10 includes a first wheel cover portion 11 and a second wheel cover portion 12. The first wheel cover portion 11 may cover one side (e.g., a left side) of the wheel 20. The second wheel cover portion 12 may cover the other side (e.g., a right side) of the wheel 20.

For example, the first wheel cover portion 11 and the second wheel cover portion 12 may have the same shape to be symmetrical to each other with respect to the wheel 20, and the present disclosure is not necessarily limited thereto.

The second wheel cover portion 12 may be coupled to the first wheel cover portion 11 to face the first wheel cover portion 11 with the wheel 20 interposed therebetween and may cover the other side (e.g., the right side) of the wheel 20.

The wheel cover 10 further includes a leg connector 13. The leg connector 13 may connect the first wheel cover portion 11 and the second wheel cover portion 12 to a robot body (not illustrated).

The first wheel cover portion 11 includes a first cover body 111 and a first connector 113.

The first cover body 111 may have a shape that convexly covers the one side (e.g., the left side) of the wheel 20 to secure a first internal space 112 having a predetermined size between the one side (e.g., the left side) of the wheel 20 and the first cover body 111.

The first connector 113 may have a shape that straightly extends from an upper end of the first cover body 111 in a height direction. The first connector 113 connects the first cover body 111 with the leg connector 13.

The second wheel cover portion 12 includes a second cover body 121 and a second connector 123.

The second cover body 121 may have a shape that convexly covers the other side (e.g., the right side) of the wheel 20 to secure a second internal space 122 having a predetermined size between the other side (e.g., the right side) of the wheel and the second cover body 121.

The second connector 123 may have a shape that straightly extends from an upper end of the second cover body 121 in the height direction. The second connector 123 connects the second cover body 121 with the leg connector 13.

In addition, a corrugated shape may be further provided on a portion in which the first connector 113 and the second connector 123 are connected to the leg connector 13 (see FIG. 1). It may be possible to buffer an impact at a connecting portion or adjust shrinkage and elongation using the corrugated shape.

A lower cover 14 may be further provided at a lower end of the wheel cover 10. The lower cover 14 is coupled to the wheel cover 10 to cover a lower open region of the wheel cover 10.

Specifically, the lower cover 14 is coupled to cover an open portion between the tire 30 exposed to a lower portion of the wheel 20 and the wheel cover 10 when the wheel 20 and the wheel cover 10 are connected. The lower cover 14 can prevent external bulky foreign substances from flowing into the wheel 20 to damage the motor 40.

A link 15 may be further provided inside the wheel cover 10 (see FIG. 6).

The link 15 is embedded in the wheel cover 10. The link 15 is embedded in the wheel cover 10 and structurally connects the motor 40 with the wheel cover 10 to serve to constrain positions therebetween.

One end of the link 15 may be fixed to the inner side of the wheel cover 10. The other end of the link 15 may be fixed to one side of the motor 40. For example, the one end of the link 15 may be formed of a rod-shaped straight link portion 151, and the other end of the link 15 may be formed of a circular link portion 152.

The straight link portion 151 may be fixed to an inner side of the first connector 113. However, the present disclosure is not limited thereto, and the straight link portion 151 may be fixed to an inner side of the second connector 123.

The circular link portion 152 may be connected to a lower end of the straight link portion 151 in a ring shape and fixed to the one side of the motor 40. The circular link portion 152 may have a structure in which the inverter cover 80 protruding in a circular cap shape is inserted into an internal hollow of the circular link portion 152 and protrudes outward from the motor 40.

The wheel 20 is a device for receiving a rotating force of the motor 40 and driving the robot to travel. The wheel 20 may have a circular body, and the tire 30 may be coupled to an outer circumferential surface of the wheel 20.

The wheel 20 includes a first wheel body portion 21 and a second wheel body portion 22. The first wheel body portion 21 may have a disk shape. The second wheel body portion 22 is a portion protruding in a circular tube shape along an edge of the disk-shaped first wheel body portion 21. The tire 30 may be mounted on an outer circumferential surface of the second wheel body portion 22.

The tire 30 is mounted on the wheel 20. The tire 30 is a member that is rotated by rolling on the ground according to the rotation of the wheel 20 and moves the robot in a set direction.

Since the tire 30 repeatedly rubs against and is in contact with the ground, the tire 30 may be made of various materials in consideration of durability, slip prevention according to a type of the ground, etc. For example, the tire 30 may be made of a material such as a rubber. For example, a fastening groove 31 is provided on an inner circumferential surface of the tire 30. Fastening protrusions 23 and 24 may be provided on the outer circumferential surface of the second wheel body portion 22. The fastening protrusions 23 and 24 may be fixedly inserted into the fastening groove 31 (see FIG. 7).

The fastening protrusions 23 and 24 include the first fastening protrusion 23 and the second fastening protrusion 24 having different shapes. For example, the first fastening protrusion 23 may be formed in a ring-shaped band shape that surrounds the outer circumferential surface of the second wheel body portion 22 in a circumferential direction. The second fastening protrusion 24 may protrude in a direction intersecting the first fastening protrusion 23 and may be formed in a straight band shape having a predetermined length in a width direction of the tire. The second fastening protrusion 24 may have a trapezoidal cross section.

In addition, a plurality of second fastening protrusions 24 may be provided, and the plurality of fastening protrusions 24 may be formed along the first fastening protrusion 23 at a predetermined distance.

As described above, since the first fastening protrusion 23 and the second fastening protrusion 24 may have a shape that protrudes by intersecting each other, the tire 30 in which the fastening groove 31 is fixedly fitted onto the first and second fastening protrusions 23 and 24 may be firmly mounted on the second wheel body portion 22.

The motor housing 50 is a housing component that stores the motor 40 therein.

The motor housing 50 is seated on and coupled to the inner side of the wheel 20. The motor housing 50 may have a cylindrical shape with one open surface and store the motor 40 therein through the one open surface.

For example, the motor housing 50 includes a first motor housing portion 51 and a second motor housing portion 52.

The first motor housing portion 51 is a disk-shaped body seated inside the wheel 20. The second motor housing portion 52 is a circular tube-shaped body that may be in close contact with the inner circumferential surface of the wheel 20. A through hole 511 may be provided at the center of the first motor housing portion 51 (see FIG. 7). Here, the through hole 511 is a circular hole having a constant diameter and formed to pass through the first motor housing portion 51 in a thickness direction. The through hole 511 is a portion where a rear end of a rotational shaft 721 of a rotor frame 72 passes and is inserted.

The rotational shaft 721 of the rotor frame 72 passes through the through hole 511 of the first motor housing portion 51, a passing-through portion of the rotational shaft 721 and the wheel 20 are integrally fastened using bolts, and the rotor frame 72 is fastened to the wheel 20 and rotates together.

The motor 40 is mounted inside the motor housing 50 to provide a rotating force to the wheel 20. In the embodiment of the present disclosure, the motor 40 is an inverter-integrated motor and may be an external rotor motor in which a rotor 70 rotates outside a stator 60 (see FIG. 7).

The motor 40 includes the stator 60 and the rotor 70. The stator 60 is fixedly positioned inside the motor housing 50, and unlike this, the rotor 70 rotates outside the stator 60.

The inverter cover 80 may have a cylindrical cap shape that covers an open portion of the motor housing 50. The motor 40 is an inverter-integrated motor, and the inverter cover 80 may be connected to the motor 40 (see FIG. 7).

The electrolytic capacitor 90 may be used for an inverter direct current (DC) link in the inverter-integrated motor 40 (see FIG. 7). As the electrolytic capacitor 90, an aluminum electrolytic capacitor (AL capacitor) may be used, but the present disclosure is not necessarily limited thereto. Therefore, although not separately illustrated, a multi-layer ceramic capacitor (MLCC) may be used for the DC link of the inverter-integrated motor.

The PCB 85 is positioned inside the inverter cover 80 (see FIG. 7). The PCB 85 may be disposed to face the motor 40, and although not separately illustrated, a plurality of inverter circuit elements may be further disposed.

In addition, an encoder sensor 88 (see FIG. 13) for detecting a rotation angle of the rotor 70 may be further disposed on the PCB 85. To this end, a sensor magnet 81 (see FIGS. 11 and 13) rotating with the rotor 70 may be further disposed on the rotor 70.

[Structure of Inverter-Integrated Motor]

Hereinafter, a structure of the inverter-integrated motor applied to the robot wheel driving apparatus according to one embodiment of the present disclosure will be described in detail with reference to the accompanying drawings.

Figure 9:
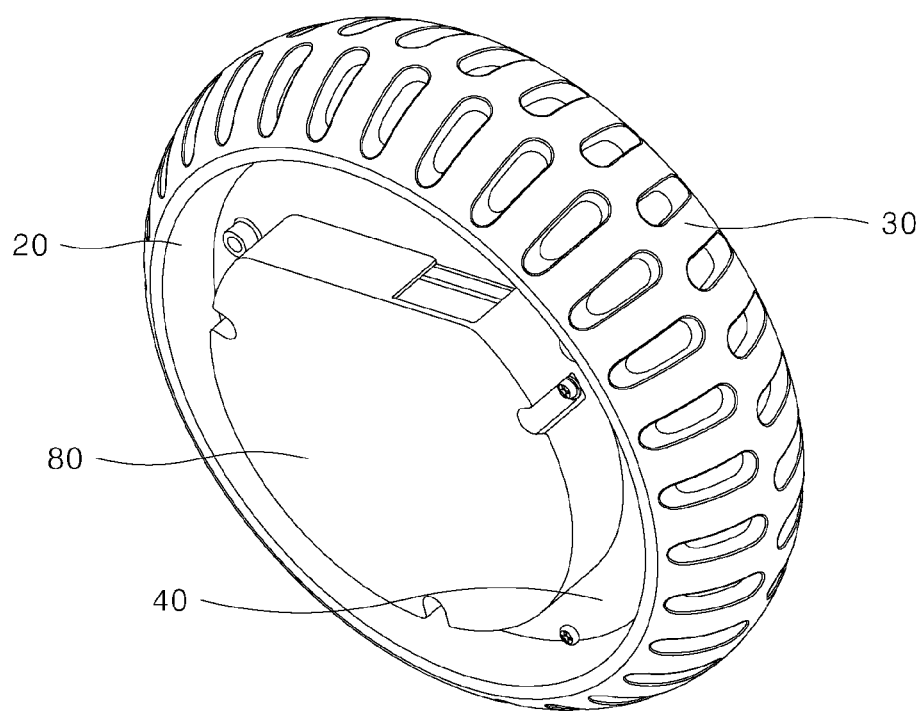
FIG. 9 is a perspective view illustrating a coupling structure of a tire, the wheel, and the motor in the robot wheel driving apparatus according to one embodiment of the present disclosure.
Figure 10:
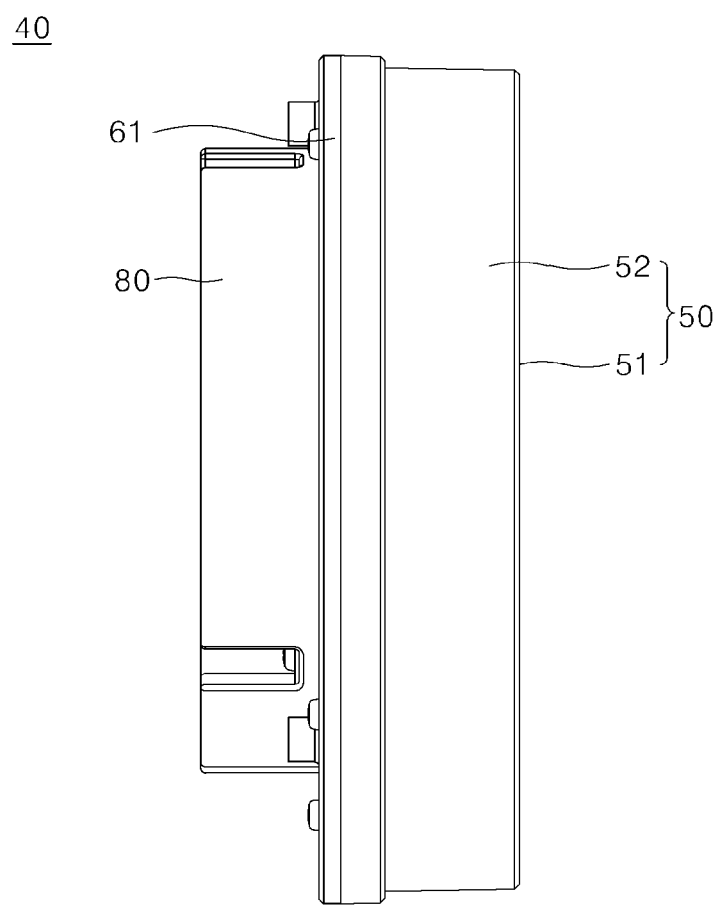
FIG. 10 is a perspective view illustrating a motor exterior shape in the robot wheel driving apparatus according to one embodiment of the present disclosure.
Figure 11:
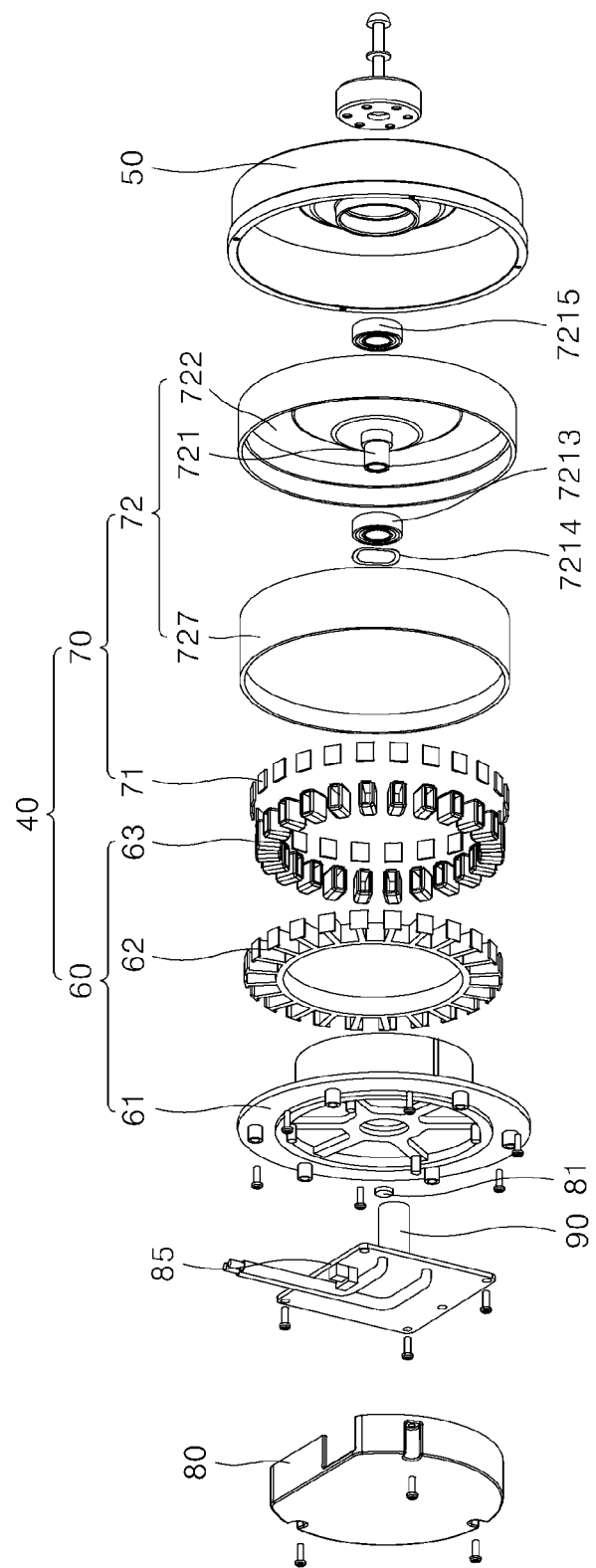
FIG. 11 is an exploded perspective view illustrating a detailed configuration of the motor in the robot wheel driving apparatus according to one embodiment of the present disclosure.
Figure 12:
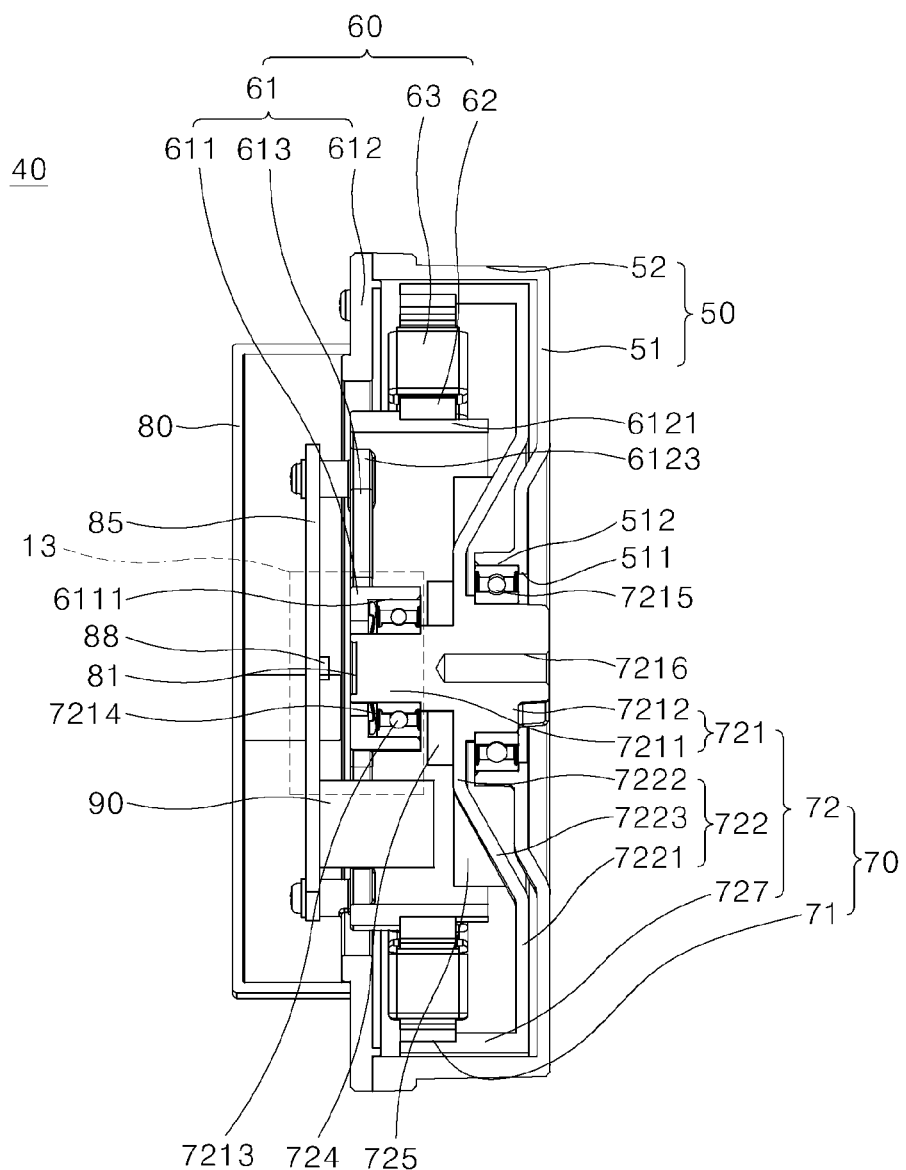
FIG. 12 is a cross-sectional view illustrating a detailed configuration of the motor in the robot wheel driving apparatus according to one embodiment of the present disclosure.
Figure 13:
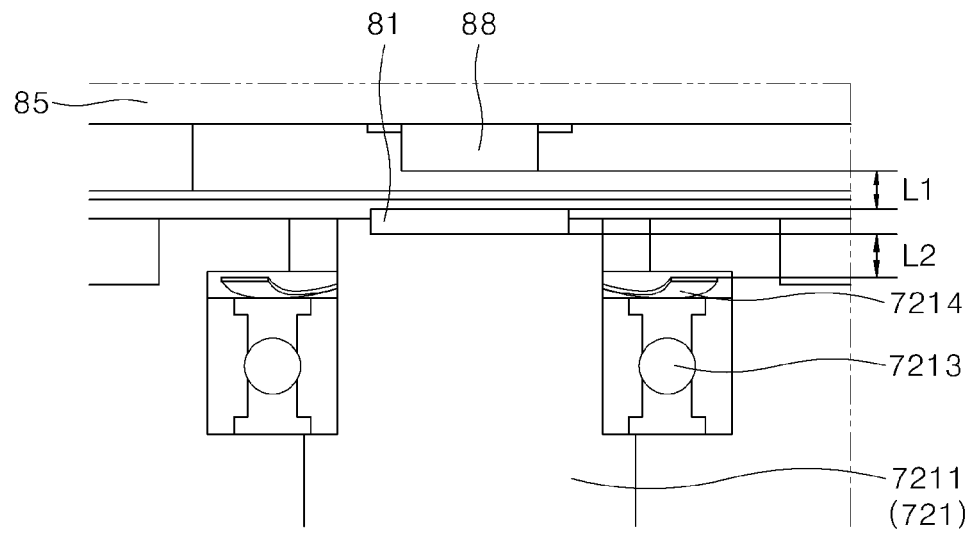
FIG. 13 is an enlarged view of region "13" in FIG. 12.

In the drawings, FIG. 9 is a view illustrating a state in which the tire, the wheel, and the motor are coupled, and FIG. 10 is a view illustrating an exterior of the inverter-integrated motor. FIG. 11 is an axially exploded view of a detailed configuration of the inverter-integrated motor according to one embodiment of the present disclosure. FIG. 12 is a view illustrating a cross-sectional structure of the inverter-integrated motor according to one embodiment of the present disclosure. FIG. 13 is an enlarged view of region "13" in FIG. 12.

Referring to FIG. 9, the wheel 20 and the tire 30 are mounted outside the motor 40.

Referring to FIG. 10, a structure in which the wheel 20 and the tire 30 are removed and the motor 40 is embedded inside the motor housing 50 is illustrated.

The motor housing 50 may have a cylindrical shape with one open surface, and the motor 40 may be inserted into the motor housing 50 using the open portion of the motor housing 50.

The motor housing 50 includes the first motor housing portion 51 and the second motor housing portion 52. The first motor housing portion 51 is a disk-shaped body. The second motor housing portion 52 is a circular tube-shaped body.

A stator frame 61 is coupled to the motor housing 50, and the inverter cover 80 having the cylindrical cap shape is connected to an outer side of the stator frame 61. As described above, the motor 40 may have the form of the inverter-integrated motor.

Referring to FIGS. 11 to 13, the motor 40 is mounted inside the motor housing 50, includes the stator 60 and the rotor 70, and further includes magnetic encoders 81 and 88 for detecting the rotation angle of the rotor 70.

The magnetic encoders 81 and 88 include the sensor magnet 81 and the encoder sensor 88 (see FIG. 13).

The sensor magnet 81 is connected to the rotor 70 to rotate with the rotor 70.

The encoder sensor 88 is positioned to face the sensor magnet 81. The encoder sensor 88 is a sensor for receiving a change in the magnetic field according to the rotation of the sensor magnet 81 to detect the rotation angle of the rotor 70.

As described above, the magnetic encoder includes the sensor magnet 81 and the encoder sensor 88 and may detect the rotation angle of the rotor 70.

In this case, it is necessary to maintain a constant distance (hereinafter referred to as "first set distance") L1 (see FIG. 13) between the sensor magnet 81 and the encoder sensor 88.

The magnetic encoder receives the change in the magnetic field (or the magnetic flux density) at each angle generated while the sensor magnet 81 rotates in the encoder sensor 88 and detects the rotation angle of the rotor 70. Therefore, the magnetic flux density of the sensor magnet 81 received in the encoder sensor 88 has a range in which a received signal is clearest, for example, 30 to 60 mT or the like. In addition, it is necessary to maintain the first set distance between the sensor magnet 81 and the encoder sensor 88 in order not to be out of the range of the magnetic flux density.

The stator 60 is fixedly positioned inside the motor housing 50. The stator 60 includes the plurality of coils 63 disposed in the circumferential direction and the stator core 62 on which the plurality of coils 63 are wound and mounted.

In addition, the stator 60 further includes the stator frame 61. The stator frame 61 is a cover member for supporting the entirety of the stator 60 and covering and coupled to the one open surface of the motor housing 50. One surface of the stator frame 61 covers and is coupled to the motor housing 50, and the inverter cover 80 is coupled to the other surface of the stator frame 61.

The stator frame 61 includes a first stator frame portion 611, a second stator frame portion 612, and a third stator frame portion 613.

The first stator frame portion 611 circularly protrudes to face the center of the motor 40. The second stator frame portion 612 circularly protrudes a predetermined distance from the first stator frame portion 611 in a radial direction. The third stator frame portion 613 is supported by radially connecting the first stator frame portion 611 to the second stator frame portion 612. The PCB 85 may be fastened to the second stator frame portion 612.

A cylindrical groove 6111 is formed at the center of the first stator frame portion 611. A front end of a first rotational shaft portion 7211 is supported by being inserted into the cylindrical groove 6111. A first bearing 7213 is inserted between the cylindrical groove 6111 and the front end of the first rotational shaft portion 7211 to support the first rotational shaft portion 7211.

The second stator frame portion 612 includes a circular protrusion 6121. The circular protrusion 6121 protrudes to an inside of the motor, and a protruding outer circumferential surface of the circular protrusion 6121 and the inner circumferential surface of the stator core 62 are supported by facing each other. The second stator frame portion 612 has a circular boss-shaped PCB fastening portion 6123 for bolt-fastening the PCB 85.

The rotor 70 is disposed outside the stator 60 with an air gap interposed therebetween. In addition, when power is supplied to the motor 40, the rotor 70 rotates about the stator 60.

The rotor 70 includes a plurality of magnets 71 and the rotor frame 72. The plurality of magnets 71 may have a structure that is disposed in the circumferential direction to face the plurality of coils 63. The rotor frame 72 fixes the plurality of magnets 71 and rotates inside the motor housing 50.

The rotor frame 72 includes the rotational shaft 721, a rotor hub 722, and a rotor yoke 727.

The rotational shaft 721 is positioned at the rotation center of the rotor 70. For example, the rotational shaft 721 has a shape protruding to extend from the center of the rotor frame 72 to have a predetermined length in an axial direction of the motor 40.

The rotor hub 722 is a disk-shaped frame protruding from the center of the rotational shaft 721 to support the rotational shaft 721. For example, the rotor hub 722 includes an outer frame 7221, an inner frame 7222, and an inclined frame 7223. The outer frame 7221 is a disk-shaped frame formed at a position far from the center of the motor 40 in the radial direction. The inner frame 7222 is a disk-shaped frame formed at a position close to the center of the motor 40 in the radial direction and connected to the outer frame 7221 with a predetermined height difference. The inclined frame 7223 connects the outer frame 7221 with the inner frame 7222 to be inclined. In addition, the rotor hub 722 may have a plurality of holes 723 passing therethrough in the thickness direction. For example, the plurality of holes 723 may have six circular holes formed with respect to the center of the motor 40. The hole 723 serves to introduce cooling air to cool the motor 40 and has a beneficial aspect in terms of light weight.

A rotor yoke 727 is a circular tube-shaped frame connected to an edge of the rotor hub 722. A plurality of magnets 71 may be attached to an inner wall surface of the rotor yoke 727 while maintaining a set distance.

The sensor magnet 81 may be coupled to a front end of the rotational shaft 721.

Referring to FIGS. 12 and 13, the rotational shaft 721 includes the first rotational shaft portion 7211 and the second rotational shaft portion 7212.

The first rotational shaft portion 7211 is positioned at the front end of the rotational shaft 721 and is supported by the first bearing 7213.

The second rotational shaft portion 7212 is positioned at a rear end of the rotational shaft 721 and has a shape with a greater diameter than the first rotational shaft portion 7211. The second rotational shaft portion 7212 is supported by the second bearing 7215. In addition, a fastening groove 7216 for bolt-fastening with the wheel 20 is provided at the rear of the second rotational shaft portion 7212. The fastening groove 7216 is positioned at the center of the rotational shaft 721, and a bolt is fastened to pass through the center of the wheel 20. Therefore, the wheel 20 and the rotor frame 72 may be concentrically connected to rotate together.

Meanwhile, the wave washer 7214 is further provided at the front end of the first bearing 7213.

The wave washer 7214 is disposed in contact with the first bearing 7213 and fixed to the front end of the first rotational shaft portion 7211.

More specifically, the sensor magnet 81 may be positioned at the front end of the first rotational shaft portion 7211. In addition, the sensor magnet 81 needs to maintain a constant distance from the wave washer 7214.

As described above, since a first set distance L1 (see FIG. 13) is maintained between the sensor magnet 81 and the encoder sensor 88, the encoder sensor 88 performs detection in a range in which a received signal of the magnetic flux density of the sensor magnet 81 is clearest, for example, in a range of 30 to 60 mT.

However, when a magnetic part is positioned around the encoder sensor 88 and the sensor magnet 81, the magnetic part affects the magnetic field of the sensor magnet 81 and also affects a change in a strength of the magnetic field (or the magnetic flux density) when the sensor magnet 81 rotates.

The first bearing 7213 and the wave washer 7214 are positioned at the front end of the first rotational shaft portion 7211 on which the sensor magnet 81 is positioned, and both the first bearing 7213 and the wave washer 7214 are formed of a magnetic part. Therefore, the sensor magnet 81 needs to maintain a constant distance from the first bearing 7213 and the wave washer 7214, which are the magnetic parts.

In particular, the wave washer 7214 is a magnetic body and has an asymmetric structure. This causes leakage and unbalance of the magnetic field of the sensor magnet 81. Therefore, the imbalance of the magnetic field increases according to the rotation angle of the sensor magnet 81, and a rotation angle error, that is, an angle error detected by the encoder sensor 88 becomes large. As a result, the position precision of the motor control is adversely affected, which becomes causes of decreasing a torque of the motor and increasing a torque ripple.

Therefore, it is necessary to maintain a constant distance (hereinafter referred to as "second set distance") L2 between the sensor magnet 81 and the wave washer 7214.

However, in order to achieve the miniaturization and light-weight of the motor 40, there are spatial limitations, and a size of the motor 40 may not be excessively increased. Therefore, it is difficult to excessively increase the second set distance L2 (see FIG. 13) between the sensor magnet 81 and the wave washer 7214 so that the sensor magnet 81 is not affected.

As described above, the first set distance L1 (see FIG. 13) between the sensor magnet 81 and the encoder sensor 88 and the second set distance L2 (see FIG. 13) between the sensor magnet 81 and the wave washer 7214 are determined in consideration of a magnetic flux density and an angle error.

The encoder sensor 88 detects the rotation angle of the rotor 70 to enable precise position control and speed control of the motor.

In this case, the angle error is a difference between an actual rotation angle of the rotor 70 and the rotation angle detected by the encoder sensor 88. When the detection and calculation of the encoder sensor 88 is not accurate, the angle error becomes large. As a result, it is difficult to perform the precise control of the motor, a torque and speed of the motor become unstable, vibration of the motor becomes large, and the quality of the motor deteriorates. Therefore, it is important to minimize the angle error for the precise control of the motor.

The angle error may be calculated as a value obtained by detecting magnetic flux densities Bx and By in an x-direction and a y-direction of the sensor magnet attached to the rotor 70 by the encoder sensor 88 and then subtracting a phase angle (atan(Bx/By)) of Bx and By from a preset reference rotation angle.

In the robot wheel driving apparatus according to the embodiment of the present disclosure, a design factor (appropriate magnetic flux density of 30 to 60 mT) that affects performance of the magnetic encoder is relative positions of the encoder sensor 88, the sensor magnet 81, and the wave washer 7214. Specifically, a difference in the magnetic flux density and angle error detected in the encoder sensor 88 may occur according to the first set distance L1 between the encoder sensor 88 and the sensor magnet 81 and the second set distance L2 between the sensor magnet 81 and the wave washer 7214 (see FIG. 13).

Figure 14:
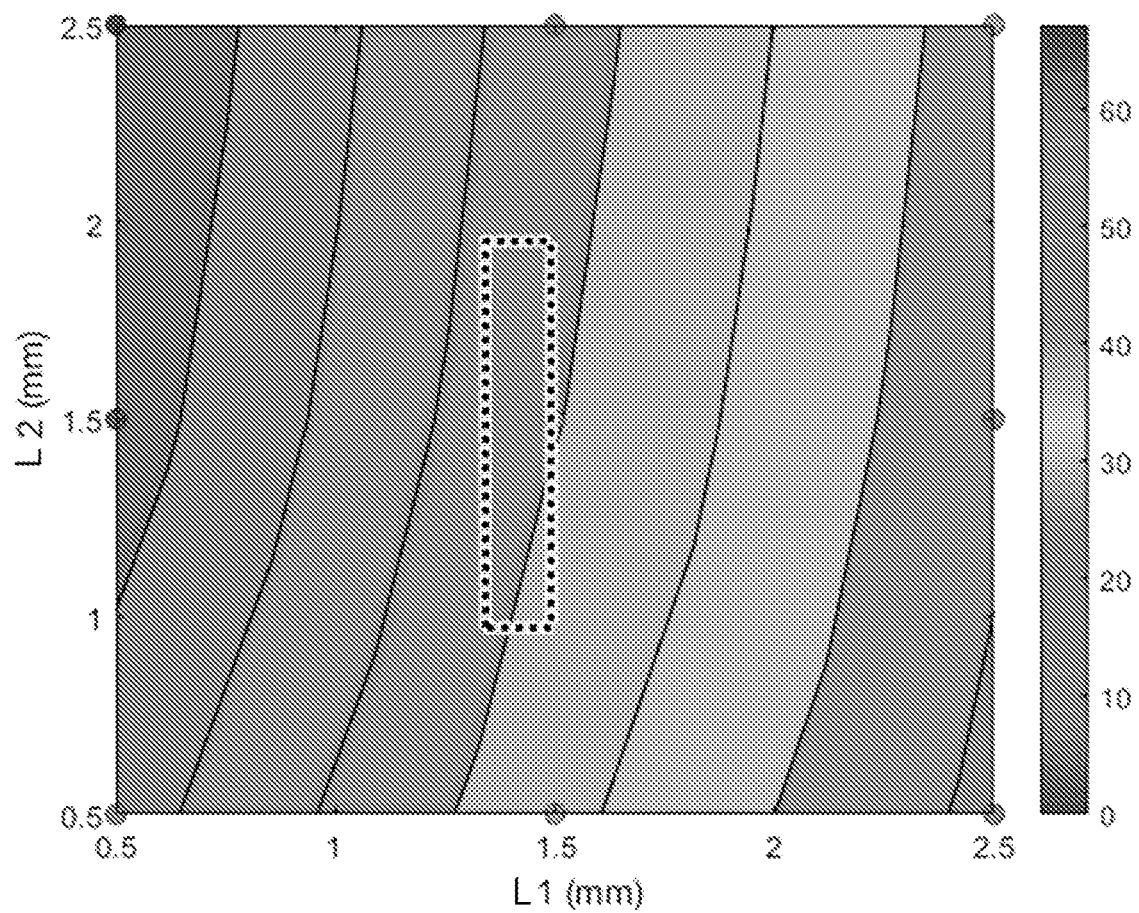
FIG. 14 is a view illustrating an analysis result image illustrating a magnetic flux density (mT) for each of a distance (L1) between an encoder sensor and a sensor magnet and a distance (L2) between the sensor magnet and a wave washer.

FIG. 14 is a view illustrating an analysis result image illustrating a magnetic flux density (mT) for each of a first set distance L1 between an encoder sensor and a sensor magnet and a second set distance L2 between the sensor magnet and a wave washer.

Referring to FIG. 14, the detected magnetic flux density is illustrated at the first set distance L1 between the encoder sensor 88 (see FIG. 13) and the sensor magnet 81 (see FIG. 13) and the second set distance L2 between the sensor magnet 81 (see FIG. 13) and the wave washer 7214 (see FIG. 13).

In order to achieve the miniaturization and light-weight of the inverter motor in the robot wheel driving apparatus according to the embodiment of the present disclosure, a size of the inverter motor may be limited so that each of L1 and L2 does not exceed a maximum of 2.5 mm. In addition, it can be assumed that a distance between the inverter motors needs to be at least 0.5 mm in order to avoid interference between components.

In this case, the magnetic flux density analysis may be performed in a range in which each of L1 and L2 is in the range of 0.5 to 2.5 mm. When the appropriate magnetic flux density detectable by the encoder sensor is in a range of to 60 mT, L1 is in a range of about 0.8 to 2.0 mm, and L2 is in a range of 0.5 to 2.5 mm. In this case, a cumulative assembly tolerance of each of L1 and L2 is ±0.5 mm, and in order not to be out of a range of a maximum distance of 2.5 mm and a minimum distance of 0.5 mm with reflecting the assembly tolerance, L1 is determined to be in a range of about 1.3 to 1.5 mm, and L2 is determined to be in a range of about 1.0 to 2.0 mm.

Figure 15:
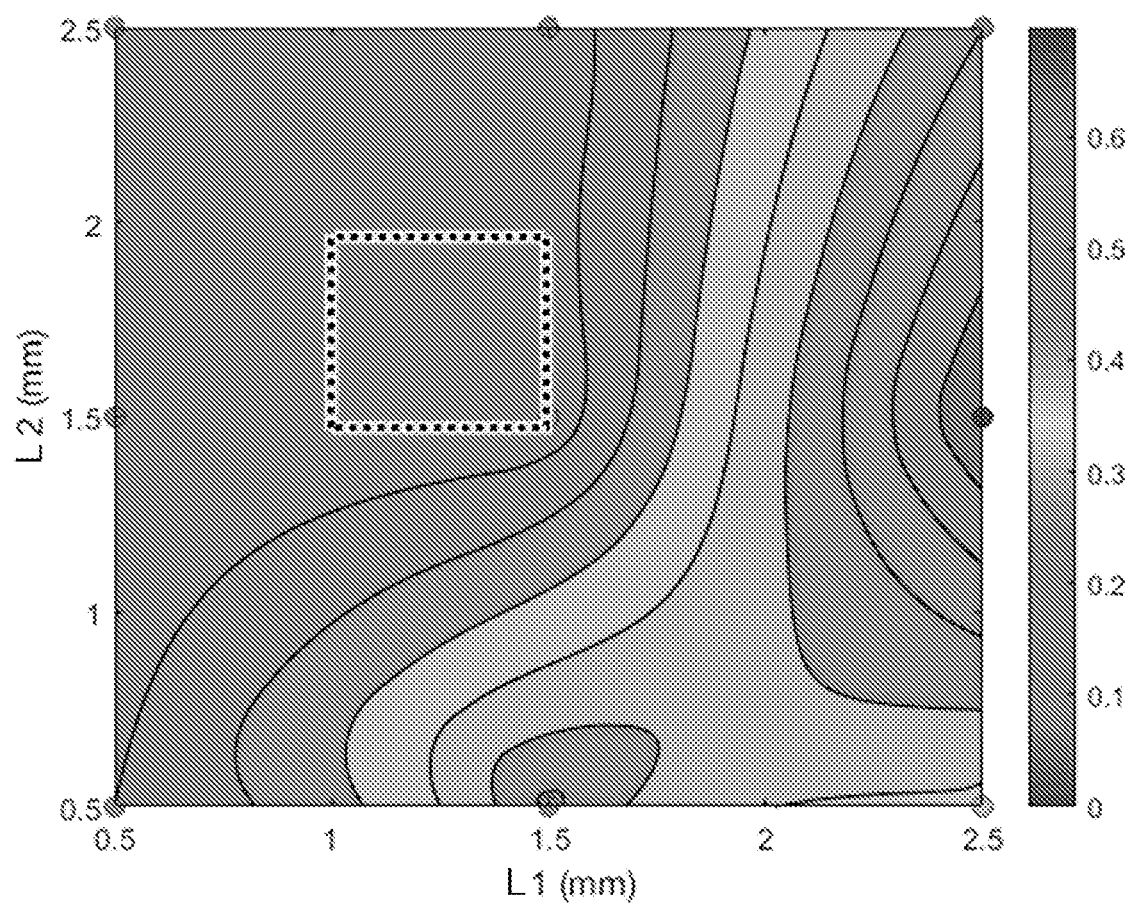
FIG. 15 is a view illustrating an analysis result image illustrating an angle error (degree) for each of the distance (L1) between the encoder sensor and the sensor magnet and the distance (L2) between the sensor magnet and the wave washer.

FIG. 15 is a view illustrating an analysis result image illustrating an angle error (degree) for each of a first set distance L1 between an encoder sensor and a sensor magnet and a second set distance L2 between the sensor magnet and a wave washer.

Referring to FIG. 15, the detected angle errors are illustrated according to the first set distance L1 between the encoder sensor 88 (see FIG. 13) and the sensor magnet 81 (see FIG. 13) and the second set distance L2 between the sensor magnet 81 (see FIG. 13) and the wave washer 7214 (see FIG. 13).

In order to achieve the miniaturization and light-weight of the inverter motor in the robot wheel driving apparatus according to the embodiment of the present disclosure, the size of inverter motor may be limited so that each of L1 and L2 does not exceed a maximum of 2.5 mm. In addition, it can be assumed that a distance between the inverter motors needs to be at least 0.5 mm in order to avoid interference between components.

In this case, the angle error of each of L1 and L2 may be calculated in a range of 0.5 to 2.5 mm.

Referring to FIG. 15, when L1 is in a range of about 0.5 to 1.5 mm and L2 is in a range of about 1.5 to 2.5 mm, a minimum angle error may be obtained.

In this case, the cumulative assembly tolerance of each of L1 and L2 is +0.5 mm, and in order not to be out of a range of a maximum distance of 2.5 mm and a minimum distance of 0.5 mm with reflecting the assembly tolerance, L1 may be determined to be in a range of about 1.0 to 1.5 mm, and L2 may be determined to be in a range of about 1.5 to 2.0 mm.

Referring to FIGS. 14 and 15, an overlapping region of the first set distance L1 (see FIG. 13) and the second set distance L2 (see FIG. 13) having the appropriate magnetic flux density and the minimum angle error is obtained when the first set distance L1 is in a range of 1.3 to 1.5 mm and the second set distance L2 is in a range of 1.5 to 2.0 mm.

Therefore, in the robot wheel driving apparatus according to the embodiment of the present disclosure, it is preferable that the first set distance L1 and the second set distance L2 have a ratio of 1.0:1.2 to 1.0:1.3. Therefore, it is possible to minimize the angle error caused by an increase in the leakage and imbalance of the magnetic force of the sensor magnet, thereby improving the control precision of the motor and improving the quality of the motor.

Figure 16:
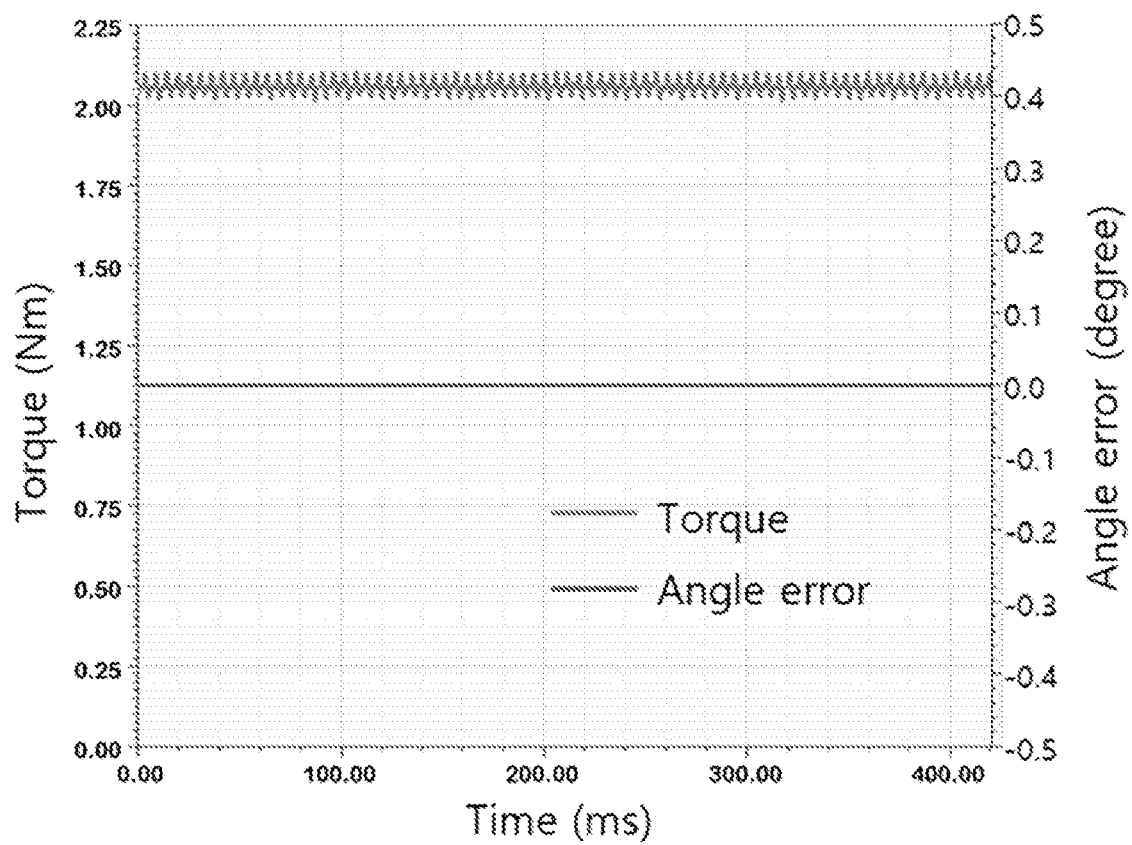
FIG. 16 is a graph illustrating torque waveforms when there is no angle error.
Figure 17:
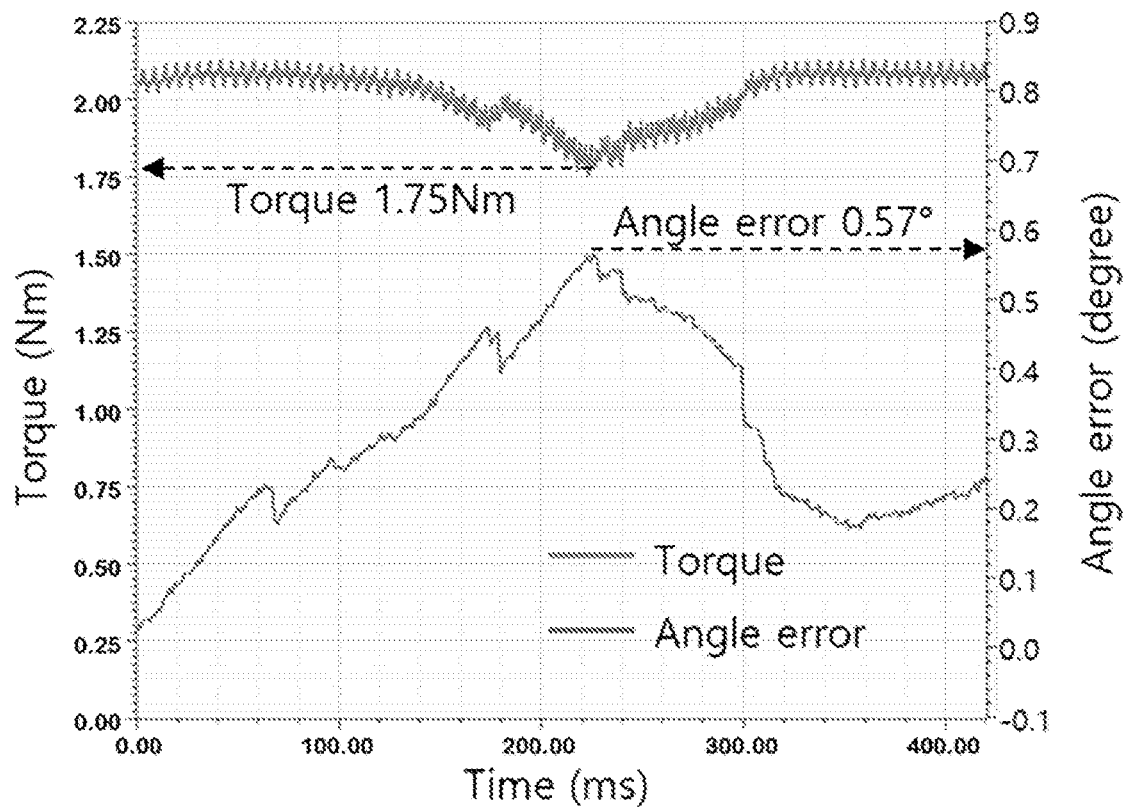
FIG. 17 is a graph illustrating torque waveforms when the angle error is a maximum of 0.6 degrees.

FIG. 16 is a graph illustrating torque waveforms when there is no angle error, and FIG. 17 is a graph illustrating torque waveforms when the angle error is a maximum of 0.6 degrees.

The precise control of the motor in the inverter motor in the robot wheel driving apparatus according to the embodiment of the present disclosure completely depends on information on the rotation angle signal detected by the encoder sensor. That is, the position, speed, and torque of the motor are controlled through current control for each rotation angle. Therefore, when the angle error becomes large, there is a problem that the torque and speed of the motor become unstable and positional accuracy deteriorates.

The inverter motor in the robot wheel driving apparatus according to the embodiment of the present disclosure improves the angle error of the magnetic encoder, thereby improving the position and speed control precision of the motor. In addition, it is possible to decrease the angle error of the magnetic encoder, thereby increasing the torque of the motor and reduce the torque ripple, thereby improving the performance of the motor.

Referring to FIG. 16, torque waveforms without angle error are illustrated. When there is no angle error, the torque waveforms may maintain an average level of 2 Nm with less torque ripple.

Referring to FIG. 17, a case in which fluctuation of the angle error becomes large is illustrated. When the fluctuation of the angle error becomes large, fluctuation of the torque waveform becomes very large. In particular, it is illustrated that when the angle error is a maximum of 0.57 degrees, a torque significantly decreases from 2 Nm to 1.75 Nm. As described above, by making an influence so that the torque decreases and the torque ripple increases as the angle error becomes large, it is possible to degrade the performance of the motor.

Meanwhile, the inverter cover 80 is coupled to one side of the motor housing 50 (see FIG. 12).

Referring to FIG. 12, the PCB 85 may be disposed inside the inverter cover 80 to face the motor 40.

The encoder sensor 88 is coupled to the PCB 85 (see FIG. 13). The encoder sensor 88 may be disposed at positions corresponding to each other to face each other while maintaining the first set distance L1 (see FIG. 13) from the sensor magnet 81 connected to the rotor 70.

In addition, the electrolytic capacitor 90 usable for the inverter DC link may be disposed inside the inverter cover 80 (see FIG. 12).

The PCB 85 may be provided inside the inverter cover 80 and disposed to face the motor 40.

Meanwhile, the stator 60 further includes the stator frame 61 (see FIG. 12).

Referring to FIG. 12, one surface of the stator frame 61 is coupled to the motor housing 50 to cover the open portion of the motor housing 50. The other surface of the stator frame 61 covers and is coupled to the inverter cover 80. In this case, the PCB 85 may be fastened to the stator frame 61 and positioned inside the inverter cover 80.

The stator frame 61 includes the first stator frame portion 611, the second stator frame portion 612, and the third stator frame portion 613.

The first stator frame portion 611 circularly protrudes to face the center of the motor 40. The second stator frame portion 612 circularly protrudes a predetermined distance from the first stator frame portion 611 in the radial direction. The third stator frame portion 613 is supported by radially connecting the first stator frame portion 611 to the second stator frame portion 612. The PCB 85 may be fastened to the second stator frame portion 612.

The cylindrical groove 6111 is formed at the center of the first stator frame portion 611. The front end of the first rotational shaft portion 7211 is supported by being inserted into the cylindrical groove 6111. The first bearing 7213 is inserted between the cylindrical groove 6111 and the front end of the first rotational shaft portion 7211 to support the first rotational shaft portion 7211. The second stator frame portion 612 includes the circular protrusion 6121.

The circular protrusion 6121 protrudes to the inside of the motor, and the protruding outer circumferential surface of the circular protrusion 6121 and the inner circumferential surface of the stator core 62 are supported by facing each other. The second stator frame portion 612 has the circular boss-shaped PCB fastening portion 6123 for bolt-fastening the PCB 85.

The plurality of PCB fastening portions 6123 are portions to which the plurality of bolts passing through the PCB 85 are screw-coupled and may firmly fix the PCB 85.

According to one aspect of the present disclosure, there can be provided a robot wheel driving apparatus in which control precision of a motor is improved, a torque of the motor is increased, and a torque ripple is decreased by improving an angle error of a magnetic encoder.

In addition, according to the embodiment of the present disclosure, it is possible to prevent leakage and imbalance of a magnetic field of a sensor magnet when a magnetic part (e.g., a bearing or a washer) is assembled around an encoder sensor and the sensor magnet in an inverter motor to which the magnetic encoder is applied.

In addition, according to the embodiment of the present disclosure, it is possible to increase accuracy of the magnetic encoder by accurately suggesting relative positions and distances between the encoder sensor, the sensor magnet, and the magnetic part (e.g., a bearing or a washer) when the magnetic encoder is applied to an inverter motor and reflecting this in a design.

Specific effects together with the above-described effects are described with a description of the following detailed matters for carrying out the disclosure.

Although the present disclosure has been described above with reference to the exemplary drawings, the present disclosure is not limited by the embodiments and drawings disclosed in the specification, and it is apparent that various modifications can be made by those skilled in the art within the scope of the technical spirit of the present disclosure. In addition, even when the operational effects according to the configuration of the present disclosure have not been explicitly described in the description of the embodiments of the present disclosure, it goes without saying that the effects predictable by the corresponding configuration should also be recognized.

What is claimed is:

1. A wheel driving apparatus comprising:
   a wheel;
   a motor housing has a cylindrical shape and is disposed inside the wheel;
   a motor comprising (i) a stator disposed inside the motor housing and (ii) a rotor disposed outside the stator and configured to rotate relative to the stator to thereby transmit a rotating force to the wheel;
   a sensor magnet connected to the rotor and configured to rotate with the rotor; and
   an encoder sensor that faces the sensor magnet and is configured to detect a change of a magnetic field based on rotation of the sensor magnet to thereby detect a rotation angle of the rotor,
   wherein the encoder sensor and the sensor magnet are spaced apart from each other by a first set distance,
   wherein the rotor comprises:
      a plurality of magnets that are arranged in a circumferential direction and face the stator, wherein an air gap is defined between the stator and the rotor, and
      a rotor frame coupled to the plurality of magnets, the rotor frame being connected to the wheel and configured to rotate in the motor housing,
   wherein the rotor frame comprises a rotational shaft that defines a center of the rotor frame and extends in an axial direction of the motor passing through the center of the rotor frame,
   wherein the rotational shaft comprises:
      a first bearing and a second bearing that support the rotational shaft,
      a first rotational shaft portion supported by the first bearing, the first rotational shaft portion having a first end and a second end that are spaced apart from each other in the axial direction, and
      a second rotational shaft portion connected to the second end of the first rotational shaft portion and supported by the second bearing, the second rotational shaft portion having a greater diameter than the first rotational shaft portion, and
   wherein the sensor magnet is positioned at the first end of the first rotational shaft portion.

2. The wheel driving apparatus of claim 1, wherein the stator comprises:
   a stator core; and
   a plurality of coils arranged inside the motor housing in the circumferential direction, the plurality of coils being wound around the stator core.

3. The wheel driving apparatus of claim 1, wherein the rotational shaft further comprises a wave washer that is in contact with an end of the first bearing and disposed closer to the first end of the first rotational shaft portion than to the second end of the first rotational shaft portion.

4. The wheel driving apparatus of claim 3, wherein the sensor magnet and the wave washer are spaced apart from each other by a second set distance.

5. The wheel driving apparatus of claim 1, wherein the rotor frame comprises:
   a rotor hub having a disk shape; and
   a rotor yoke having a cylindrical shape, the rotor yoke being disposed along an edge of the rotor hub, and
   wherein the plurality of magnets are attached to an inner wall surface of the rotor yoke.

6. The wheel driving apparatus of claim 5, wherein the rotor hub comprises:
   an outer frame that has a disk shape and is spaced apart from a center of the motor in a radial direction of the rotor;
   an inner frame that has a disk shape and is disposed closer to the center of the motor in the radial direction than the outer frame, wherein axial positions of to the inner frame and the outer frame are spaced apart from each other in the axial direction; and
   an inclined frame that connects the outer frame to the inner frame.

7. The wheel driving apparatus of claim 1, further comprising:
   an inverter cover coupled to one side of the motor housing; and
   a printed circuit board (PCB) that is disposed inside the inverter cover and faces the motor,
   wherein the encoder sensor is coupled to the PCB and faces the sensor magnet.

8. The wheel driving apparatus of claim 7, wherein the stator further comprises a stator frame that supports the stator, the stator cover having (i) a first surface that covers and is coupled to one open surface of the motor housing and (ii) a second surface that covers and is coupled to the inverter cover, and
   wherein the PCB is fixed to the stator frame.

9. The wheel driving apparatus of claim 8, wherein the stator frame comprises:
   a first stator frame portion that surrounds a central axis of the motor;
   a second stator frame portion that surrounds the first stator frame portion and is spaced apart from the first stator frame portion by a predetermined distance in a radial direction; and
   a third stator frame portion that radially connects the first stator frame portion to the second stator frame portion, and
   wherein the PCB is fixed to the second stator frame portion.

10. A wheel driving apparatus comprising:
   a wheel;
   a tire coupled to the wheel;
   a wheel cover that covers sides of the wheel;
   a lower cover that is coupled to a lower portion of the wheel cover and configured to cover a portion between the tire and the wheel cover based on the wheel and the wheel cover being connected to each other;
   a motor housing that is disposed inside the wheel and has a cylindrical shape;
   a motor comprising (i) a stator fixed inside the motor housing and (ii) a rotor disposed outside the stator and configured to rotate relative to the stator to thereby transmit a rotating force to the wheel;

a sensor magnet connected to the rotor and configured to rotate with the rotor; and an encoder sensor that faces the sensor magnet and is configured to detect a change of a magnetic field based on rotation of the sensor magnet to thereby detect a rotation angle of the rotor, wherein the sensor magnet and the encoder sensor are spaced apart from each other by a first set distance, wherein the rotor comprises:
- a plurality of magnets that are arranged in a circumferential direction and face the stator, wherein an air gap is defined between the stator and the rotor, and
- a rotor frame coupled to the plurality of magnets, the rotor frame being connected to the wheel and configured to rotate in the motor housing, wherein the rotor frame comprises a rotational shaft that extends in an axial direction of the rotor, wherein the rotational shaft comprises:
- a first bearing and a second bearing that support the rotational shaft,
- a first rotational shaft portion supported by the first bearing, the first rotational shaft portion having a first end and a second end that are spaced apart from each other in the axial direction, and
- a second rotational shaft portion connected to the second end of the first rotational shaft portion and supported by the second bearing, the second rotational shaft portion having a greater diameter than the first rotational shaft portion, and wherein the sensor magnet is positioned at the first end of the first rotational shaft portion.

11. The wheel driving apparatus of claim 10, wherein the rotational shaft further comprises a wave washer that is in contact with an end of the first bearing and disposed closer to the first end of the first rotational shaft portion than to the second end of the first rotational shaft portion.

12. The wheel driving apparatus of claim 11, wherein the sensor magnet and the wave washer are spaced apart from each other by a second set distance.

13. The wheel driving apparatus of claim 10, wherein the wheel comprises:
- a first wheel body portion having a disk shape; and
- a second wheel body portion having a circular tube shape that protrudes from and extends along an edge of the first wheel body portion, and
wherein the tire is disposed on the second wheel body portion.

14. The wheel driving apparatus of claim 10, wherein the wheel cover comprises:
- a first wheel cover portion that covers a first side of the wheel among the sides of the wheel;
- a second wheel cover portion that covers a second side of the wheel opposite to the first side of the wheel, the second wheel cover being coupled to and facing the first wheel cover portion, wherein the wheel is disposed between the first wheel cover and the second wheel cover; and
- a leg connector connected to the first wheel cover portion and the second wheel cover portion, the leg connector being configured to connect the wheel cover to an object.

15. The wheel driving apparatus of claim 14, wherein the first wheel cover portion comprises:
- a first cover body that faces the first side of the wheel, the first cover body having a convex shape that defines an internal space between the first side of the wheel and the first cover body; and
- a first connector that extends from an end of the first cover body to the leg connector in a height direction and connects the first cover body to the leg connector, and wherein the second wheel cover portion comprises:
- a second cover body that faces the second side of the wheel, the second cover body having a convex shape that defines an internal space between the second side of the wheel and the second cover body, and
- a second connector that extends from an end of the second cover body to the leg connector in the height direction and connects the second cover body to the leg connector.

16. A wheel driving apparatus comprising:
a wheel;
a tire coupled to the wheel;
a wheel cover that covers sides of the wheel;
a lower cover that is coupled to a lower portion of the wheel cover and configured to cover a portion between the tire and the wheel cover based on the wheel and the wheel cover being connected to each other;
a motor housing that is disposed inside the wheel and has a cylindrical shape;
a motor comprising (i) a stator fixed inside the motor housing and (ii) a rotor disposed outside the stator and configured to rotate relative to the stator to thereby transmit a rotating force to the wheel;
a sensor magnet connected to the rotor and configured to rotate with the rotor; and
an encoder sensor that faces the sensor magnet and is configured to detect a change of a magnetic field based on rotation of the sensor magnet to thereby detect a rotation angle of the rotor, wherein the sensor magnet and the encoder sensor are spaced apart from each other by a first set distance, and wherein the wheel cover comprises:
- a first wheel cover portion that covers a first side of the wheel among the sides of the wheel,
- a second wheel cover portion that covers a second side of the wheel opposite to the first side of the wheel, the second wheel cover being coupled to and facing the first wheel cover portion, wherein the wheel is disposed between the first wheel cover and the second wheel cover, and
- a leg connector connected to the first wheel cover portion and the second wheel cover portion, the leg connector being configured to connect the wheel cover to an object.

17. The wheel driving apparatus of claim 16, wherein the first wheel cover portion comprises:
- a first cover body that faces the first side of the wheel, the first cover body having a convex shape that defines an internal space between the first side of the wheel and the first cover body; and
- a first connector that extends from an end of the first cover body to the leg connector in a height direction and connects the first cover body to the leg connector, and wherein the second wheel cover portion comprises:
- a second cover body that faces the second side of the wheel, the second cover body having a convex shape that defines an internal space between the second side of the wheel and the second cover body, and
- a second connector that extends from an end of the second cover body to the leg connector in the height direction and connects the second cover body to the leg connector.

* * * * *